US008954980B2

(12) United States Patent
Stubbs et al.

(10) Patent No.: US 8,954,980 B2
(45) Date of Patent: Feb. 10, 2015

(54) CONSERVING POWER THROUGH WORK LOAD ESTIMATION FOR A PORTABLE COMPUTING DEVICE USING SCHEDULED RESOURCE SET TRANSITIONS

(75) Inventors: Joshua H. Stubbs, Longmont, CO (US); Andrew J. Frantz, Superior, CO (US); Sean D. Sweeney, Firestone, CO (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 13/364,849

(22) Filed: Feb. 2, 2012

(65) Prior Publication Data
US 2013/0125130 A1    May 16, 2013

Related U.S. Application Data

(60) Provisional application No. 61/558,743, filed on Nov. 11, 2011.

(51) Int. Cl.
*G06F 9/50* (2006.01)
*G06F 9/48* (2006.01)
(Continued)

(52) U.S. Cl.
CPC ............... *G06F 9/50* (2013.01); *G06F 9/4893* (2013.01); *G06F 1/329* (2013.01); *G06F 9/4887* (2013.01); *H04W 52/0283* (2013.01); *Y02B 60/144* (2013.01)
USPC ............................ 718/104; 713/322; 718/100

(58) Field of Classification Search
USPC .......... 718/103, 104, 105, 107; 713/300, 320, 713/323
See application file for complete search history.

(56) References Cited

U.S. PATENT DOCUMENTS

| | | | |
|---|---|---|---|
| 5,461,266 | A | 10/1995 | Koreeda et al. |
| 5,692,197 | A | 11/1997 | Narad et al. |
| 5,812,860 | A | 9/1998 | Horden et al. |

(Continued)

FOREIGN PATENT DOCUMENTS

| | | | |
|---|---|---|---|
| CN | 101414271 | A | 4/2009 |
| JP | 11266254 | A | 9/1999 |
| JP | 2006072991 | A | 3/2006 |

OTHER PUBLICATIONS

W.D. Maurer, Hash Table Methods, Mar. 1975, Computing Surveys, vol. 7.*

(Continued)

*Primary Examiner* — Lewis A Bullock, Jr.
*Assistant Examiner* — Wynuel Aquino
(74) *Attorney, Agent, or Firm* — Nicholas A. Cole

(57) ABSTRACT

A start time to begin transitioning resources to states indicated in the second resource state set is scheduled based upon an estimated amount of processing time to complete transitioning the resources. At a scheduled start time, a process starts in which the states of one or more resources are switched from states indicated by the first resource state set to states indicated by the second resource state set. Scheduling the process of transitioning resource states to begin at a time that allows the process to be completed just in time for the resource states to be immediately available to the processor upon entering the second application state helps minimize adverse effects of resource latency. This calculation for the time that the process should be completed just in time may be enhanced when system states and transitions between states are measured accurately and stored in memory of the portable computing device.

40 Claims, 23 Drawing Sheets

(51) Int. Cl.
  *G06F 1/32* (2006.01)
  *H04W 52/02* (2009.01)

(56) References Cited

U.S. PATENT DOCUMENTS

| | | | |
|---|---|---|---|
| 6,098,118 | A | 8/2000 | Ellenby et al. |
| 6,405,320 | B1 | 6/2002 | Lee et al. |
| 6,545,999 | B1 | 4/2003 | Sugita |
| 6,823,516 | B1 | 11/2004 | Cooper |
| 6,910,036 | B1 * | 6/2005 | Shee ................................. 1/1 |
| 7,062,302 | B2 | 6/2006 | Yamaoka |
| 7,089,430 | B2 * | 8/2006 | Cooper .......................... 713/300 |
| 7,389,436 | B2 | 6/2008 | Osborn |
| 7,609,171 | B2 | 10/2009 | Haapoja et al. |
| 7,640,473 | B2 * | 12/2009 | Kawasaki ....................... 714/726 |
| 7,906,996 | B1 | 3/2011 | Fuks et al. |
| 7,941,682 | B2 | 5/2011 | Adams |
| 7,962,775 | B1 | 6/2011 | Vaidyu et al. |
| 8,041,972 | B2 | 10/2011 | Jarosinski et al. |
| 8,099,731 | B2 * | 1/2012 | Li et al. ........................... 718/104 |
| 8,230,249 | B2 | 7/2012 | Dasgupta et al. |
| 8,271,818 | B2 | 9/2012 | Blanding |
| 8,589,932 | B2 | 11/2013 | Bower, III et al. |
| 8,618,780 | B2 | 12/2013 | Mounier et al. |
| 8,683,476 | B2 * | 3/2014 | Saxe et al. ....................... 718/104 |
| 8,694,817 | B2 | 4/2014 | Hoffknecht et al. |
| 8,725,488 | B2 | 5/2014 | Hofmann et al. |
| 2003/0226043 | A1 | 12/2003 | Hicok |
| 2006/0031692 | A1 | 2/2006 | Kato et al. |
| 2006/0136756 | A1 | 6/2006 | Rothman et al. |
| 2006/0146769 | A1 | 7/2006 | Patel et al. |
| 2007/0290727 | A1 | 12/2007 | Jarosinski et al. |
| 2008/0052543 | A1 | 2/2008 | Sokorac |
| 2008/0091965 | A1 | 4/2008 | Nychka et al. |
| 2009/0049314 | A1 * | 2/2009 | Taha et al. ..................... 713/300 |
| 2009/0249103 | A1 | 10/2009 | Jeyaseelan et al. |
| 2009/0307519 | A1 | 12/2009 | Hyatt |
| 2009/0328046 | A1 | 12/2009 | Proctor et al. |
| 2010/0058087 | A1 | 3/2010 | Borras et al. |
| 2010/0095143 | A1 | 4/2010 | Yamaji |
| 2010/0107166 | A1 | 4/2010 | Topaloglu |
| 2010/0191814 | A1 | 7/2010 | Heddes et al. |
| 2010/0267407 | A1 | 10/2010 | Liao et al. |
| 2010/0316099 | A1 | 12/2010 | Sugita et al. |
| 2010/0332876 | A1 | 12/2010 | Fields, Jr. et al. |
| 2011/0119422 | A1 | 5/2011 | Grouzdev |
| 2011/0173470 | A1 | 7/2011 | Tran |
| 2011/0252251 | A1 | 10/2011 | de Cesare et al. |
| 2011/0307891 | A1 * | 12/2011 | Orr et al. ........................ 718/100 |
| 2012/0084589 | A1 | 4/2012 | Millet et al. |
| 2012/0110351 | A1 * | 5/2012 | Raju et al. ...................... 713/300 |
| 2012/0159222 | A1 | 6/2012 | Frantz et al. |
| 2012/0284729 | A1 * | 11/2012 | Sharda et al. .................. 718/104 |
| 2012/0291042 | A1 | 11/2012 | Stubbs et al. |
| 2012/0291043 | A1 | 11/2012 | Stubbs et al. |
| 2013/0007492 | A1 | 1/2013 | Sokol, Jr. et al. |
| 2014/0173621 | A1 | 6/2014 | Stubbs et al. |

OTHER PUBLICATIONS

Benin L., et al., "A Survey of Design Techniques for System-Level Dynamic Power Management", Jun. 1, 2000, IEEE Transactions on Very Large Scale Integration (VLSI) Systems, IEEE Service Center, Piscataway, NJ, USA, p. 299 XP008057349, ISSN: 1063-8210 the whole document.

Li J., et al., "The Thrifty Barrier: Energy-Aware Synchronization in Shared-Memory Multiprocessors", Feb. 14, 2004, High Performance Computer Architecture, 2004. HPCA-10. Proceedings. 10 th International Symposiums on Madrid, Spain Feb. 14-18, 2004, Piscataway, NJ, USA, IEEE, pp. 14-14, XP010778825, ISBN: 978-0-7695-2053-7 the whole document.

Pantazis et al., "Power control schemes in wireless sensor networks for homecare e-health applications", Proceedings of the 1st international conference on PErvasive Technologies Related to Assistive Environments Jun. 19, 2008, XP002670363, Retrieved from the Internet: URL: http://dl.acm.org/citation.cfm"id=1389683 [retrieved on Feb. 24, 2012] the whole document.

International Search Report—PCT/US2012/061415—ISA/EPO—Feb. 24, 2014.

Maurer W.D., et al., "Hash Table Methods", ACM Computing Surveys, ACM, New York, NY, US, US, vol. 7, No. 1, Mar. 1, 1975, pp. 5-19, XP009022942, ISSN: 0360-0300, DOI: 10.1145/356643. 356645 abstract 1ine 1-p. 7, 1ine 10.

* cited by examiner

| ACTIVE/SLEEP TRIGGER SETS | | | |
|---|---|---|---|
| | SLEEP | ACTIVE | TIMER |
| INTERRUPT | SHUT DOWN | BRINGUP | <TIME> |
| FROM SET | FROM ANY # | SLEEP | SLEEP |
| GOTO SET | SLEEP | TO ANY # | TO ANY # |

FIG. 4

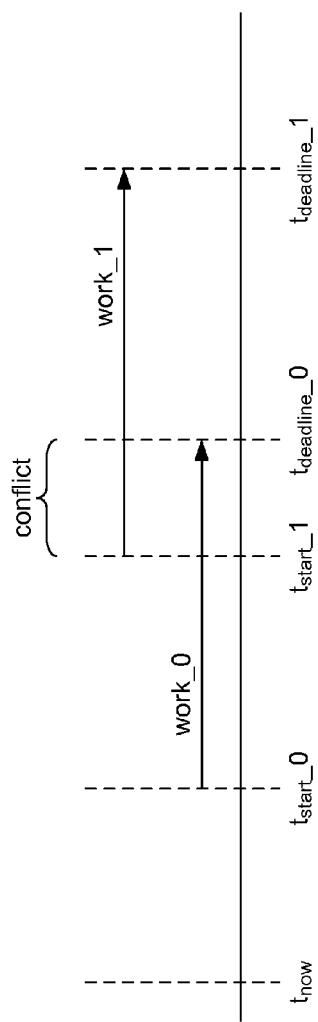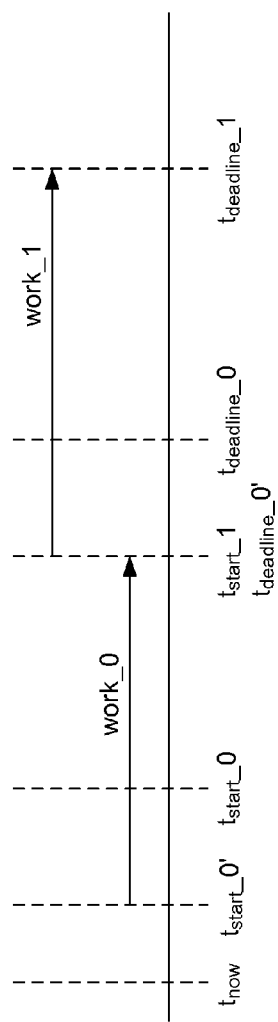

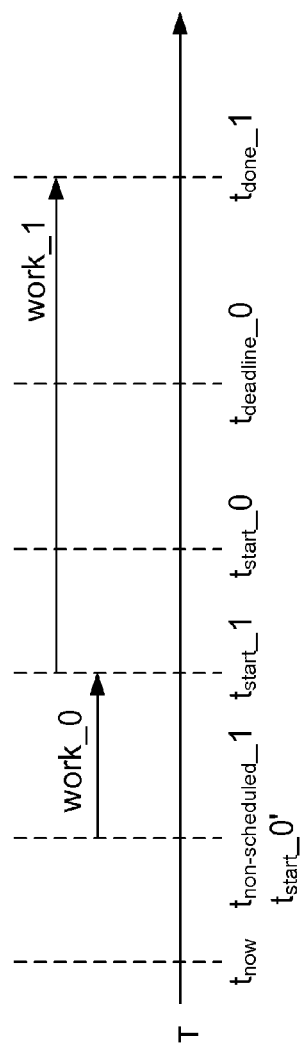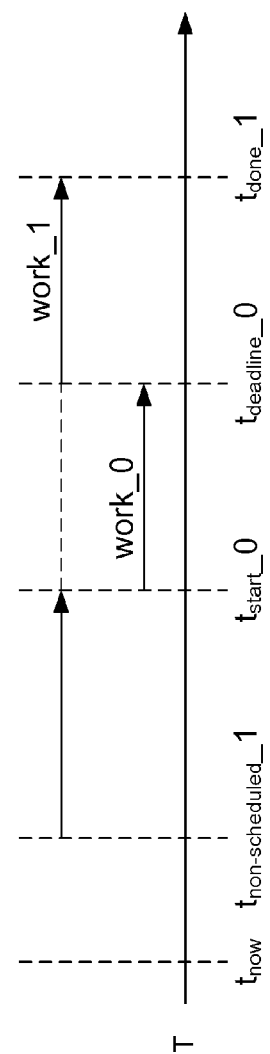

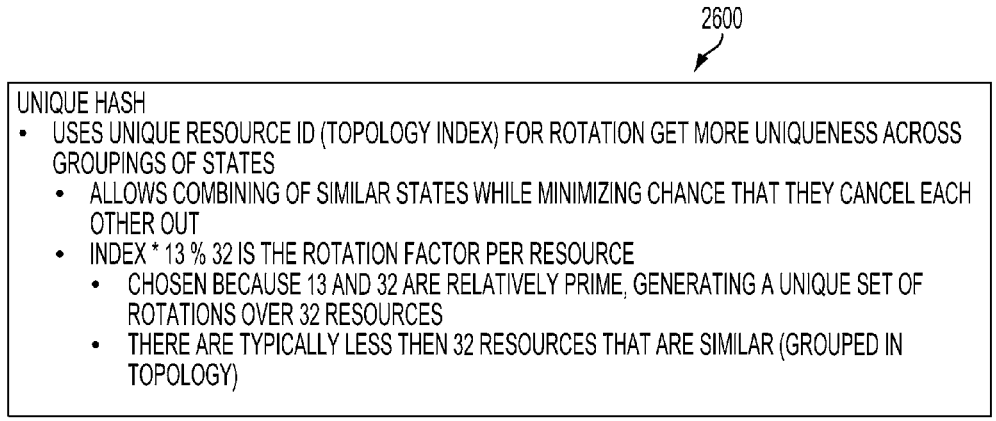
FIG. 26
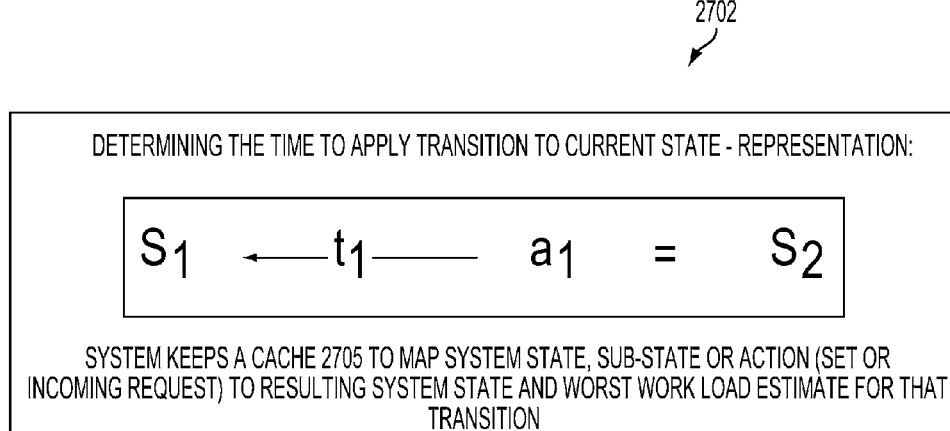
FIG. 27A
| SYSTEM STATE | SUB-STATE (ACTION) | ESTIMATE | RESULT SYSTEM STATE |
|---|---|---|---|
| $S_1$ | $a_1$ | t1 | $S_2$ |
| $S_2$ | $a_2$ | t2 | $S_1$ |
| $S_1$ | $a_3$ | t3 | $S_3$ |
| $S_2$ | $a_4$ | t4 | $S_4$ |
| $S_3$ | $a_5$ | t5 | $S_1$ |
FIG. 27B

CONSERVING POWER THROUGH WORK LOAD ESTIMATION FOR A PORTABLE COMPUTING DEVICE USING SCHEDULED RESOURCE SET TRANSITIONS

PRIORITY AND RELATED APPLICATIONS STATEMENT

This application claims priority under 35 U.S.C. §119(e) to U.S. Provisional Patent Application Ser. No. 61/558,743, entitled, "USING SCHEDULED RESOURCE SET TRANSITIONS," filed on Nov. 11, 2011. The entire contents of which are hereby incorporated by reference. This application is also related to U.S. Non-Provisional patent application Ser. No. 13/291,767, entitled, "Title: MINIMIZING RESOURCE LATENCY BETWEEN PROCESSOR APPLICATION STATES IN A PORTABLE COMPUTING DEVICE BY SCHEDULING RESOURCE SET TRANSITIONS," filed on Nov. 8, 2011.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

PCDs typically have complex and compact electronic packaging that is generally made of multiple processing units that include central processing units, digital signal processors, and the like. Much of this hardware may be part of a system on a chip ("SOC") design as understood by one of ordinary skill in the art.

Conventional PCD's usually experience significant lag time when respective processors of different SOCs try to enter into low power states. Low power states, in which a processor or similar subsystem is not executing any application program or is otherwise effectively idle, are also referred to as sleep states, as understood by one of ordinary skill in the art.

One problem faced by conventional processors is that several communications usually take place in software in order for a processor to enter into a sleep state. This problem is further complicated by the fact that some resources are shared resources whose state needs to be coordinated between multiple SOC subsystems.

Within a given subsystem of SOC, the management of local resources is usually easy and may be done from the respective operating system's idle context. However, to manage the shutdown of a shared resources state usually has to be coordinated with the controller of that resource. Conventional solutions have worked around this shutdown complication through use of synchronous handshake in software before the subsystems are permitted to enter a sleep state. This approach is disadvantageous for several reasons: Software handshakes are slow. Software handshakes are prone to all sorts of delay, particularly interrupt service and context switch problems.

Software handshakes delay power savings. Because a handshake is in software, the instruction processing core needs to remain on until the full handshake is complete. Processor cores are large and complex, thus this is a considerable penalty in power savings to pay.

Accordingly, what is needed in the art is a method and system for allowing processors of PCDs to enter sleep states without software handshakes.

SUMMARY

A method and system for managing application states, such as sleep states and active states, of a portable computing device are described. Resource state sets corresponding to the application states are maintained in memory. A request may be issued for a processor operating in a first application state corresponding to the first resource state set to transition from the first application state to a second application state corresponding to the second resource state set. A start time to begin transitioning resources to states indicated in the second resource state set is scheduled based upon an estimated amount of processing time to complete transitioning the resources. At a scheduled start time, a process is begun by which the states of one or more resources are switched from states indicated by the first resource state set to states indicated by the second resource state set. Scheduling the process of transitioning resource states to begin at a time that allows the process to be completed just in time for the resource states to be immediately available to the processor upon entering the second application state helps minimize adverse effects of resource latency. This scheduling of the process of transitioning resource states to begin at a time that allows the process to be completed just in time may significantly conserve power when workloads among the resources are accurately estimated. Exemplary embodiments of how workloads are accurately estimated are described.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 4 illustrates an exemplary active-sleep trigger set for a processor;

FIG. 11 is a timeline indicating a conflict condition between processing associated with two requests;

FIG. 12 is a timeline indicating a result of an exemplary method for alleviating the conflict condition of FIG. 11;

FIG. 17 is a timeline indicating a resulting of a secondary exemplary method for alleviating the conflict condition of FIG. 15;

FIG. 18 is a timeline indicating a resulting of another exemplary method for alleviating the conflict condition of FIG. 16;

FIG. 26 is a chart which illustrates exemplary features of one embodiment of a hash function used by the controller.

FIG. 27A is a chart illustrating elements that may be used in a system state cache.

FIG. 27B is one exemplary embodiment of a system state cache.

DETAILED DESCRIPTION

Figure 1:
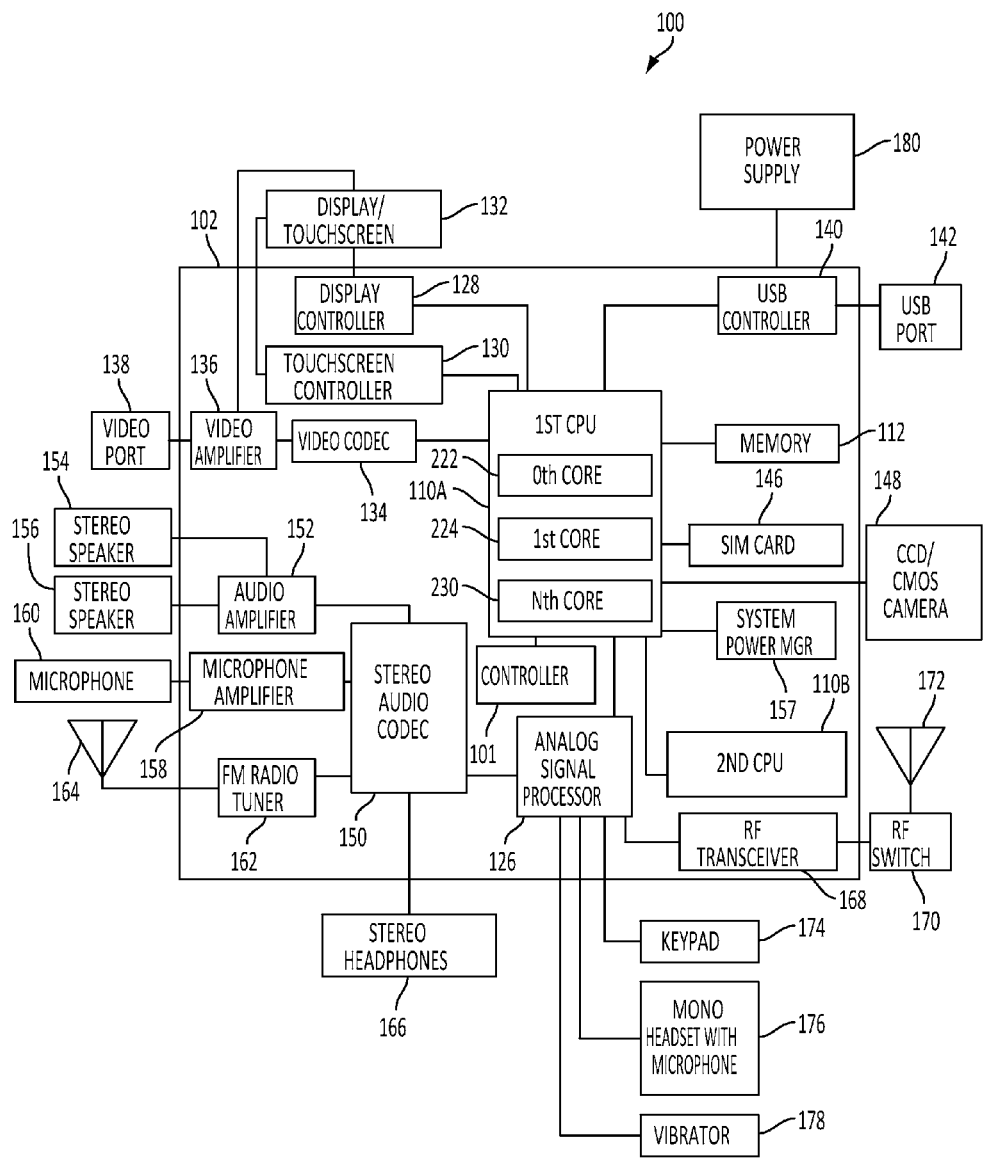
FIG. 1 is a functional block diagram illustrating an embodiment of a portable computing device (PCD)

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, and a laptop computer with a wireless connection, among others.

Referring to FIG. 1, this FIG. is a functional block diagram of an exemplary, non-limiting aspect of a PCD 100 in the form of a wireless telephone for implementing methods and systems for managing rapid sleep states of processors 110, 126 within the PCD 100. As shown, the PCD 100 includes an on-chip system 102 that includes a multi-core, first central processing unit ("CPU") 110A, a second CPU 110B that is a single-core type, and an analog signal processor 126.

These three processors 110A, 110B, and 126 may be coupled together. The first CPU 110A may comprise a zeroth core 222, a first core 224, and an Nth core 230 as understood by one of ordinary skill in the art. In an alternate embodiment, instead of using two CPUs 110, two digital signal processors ("DSPs") may also be employed as understood by one of ordinary skill in the art. In a further exemplary embodiment, any of the aforementioned may used in a combination as understood by one of ordinary skill in the art.

FIG. 1 includes one or more controller module(s) 101. For the remainder of this description, the controller module(s) 101 will be referred to in the singular, as a controller 101, and not plural. One of ordinary skill in the art will recognize that the controller 101 may be divided into various parts and executed by different processors 110, 126 without departing from the invention. Alternatively, the controller 101 may be organized as a single element and executed by a single processor 110 or 126.

FIG. 1 also illustrates system power manager 157. The system power manager ("SPM") 157 is coupled to the CPU 110A and the controller 101. The SPM 157 generally comprises hardware, such as a processor. However, software and/or firmware may be employed for the SPM 157 as understood by one of ordinary skill in the art. The SPM 157 may be responsible for monitoring the state of a processor 110, 126 and a power rail. The SPM 157 may detect when a processor 110, 126 is about to enter a sleep state or is about to leave a sleep state. The SPM 157 may communicate these states of a processor 110, 126 to the controller 101. More generally, the SPM 157 may detect when a processor 110, 126 is about to transition from one application state to another. Application states of a processor 110, 126 may include not only a sleep state in which the processor 110, 126 is effectively idle or not executing any application programs and an awake or active state in which it is executing one or more application programs but also, or alternatively, any of the following: a state in which the processor 110, 126 is operating at a higher or lower speed than it operates in another state; a state defined by the processor 110, 126 executing an application program that is different from another state defined by the processor 110, 126 executing another application program; and a state defined by the processor 110, 126 concurrently executing a number of application programs that is different from another state defined by the processor 110, 126 concurrently executing a different number of application programs.

The controller 101 may comprise software which is executed by the CPUs 110. However, the controller 101 may also be formed from hardware and/or firmware as understood by one of ordinary skill in the art.

In general, the controller 101 may be responsible for promoting the rapid entry into sleep states and the rapid exiting from sleep states for the processors 110, 126. The controller 101 may also be responsible for maintaining one or more system state caches 2705 (See FIG. 27B) for tracking system states as will be described below.

The controller 101 may also include one or more tables that comprise resource sets and trigger sets as will be described in further detail below in connection with FIG. 3. The controller 101 may also have its own interrupt controller (not illustrated) for when all other hardware elements in the PCD 100 are placed in a low power state and are not functional.

The controller 101 also manages resource requests among one or more master processors 110, 126. Resource requests may be issued by a master processor 110 to request an action or function from a resource 105 (See FIG. 2).

Resources 105 are described more generally below but may include, for example, clocks and other low-level processors that support tasks, commands, and features of software applications that are executed by one or more master processors 110, 126. The controller 101 may be designed to prevent resource request conflicts among a plurality of master processors 110, 126.

FIG. 1 shows that the PCD 100 may include memory 112. The controller 101 running on the CPUs 110 may access the memory 112 to facilitate rapid sleep states and to facilitate rapid exiting from sleep states as will be described in further detail below.

In a particular aspect, one or more of the method steps described herein may implemented by executable instructions and parameters stored in the memory 112 that form the controller 101. These instructions that form the controller 101 may be executed by the CPUs 110, the analog signal processor 126, or another processor. Further, the processors, 110, 126, the memory 112, the instructions stored therein, or a combination thereof may serve as a means for performing one or more of the method steps described herein.

As illustrated in FIG. 1, a display controller 128 and a touchscreen controller 130 are coupled to the digital signal processor 110. A touchscreen display 132 external to the on-chip system 102 is coupled to the display controller 128 and the touchscreen controller 130.

FIG. 1 is a schematic diagram illustrating an embodiment of a portable computing device (PCD) that includes a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134. The video codec 134 is coupled to the multicore central processing unit ("CPU") 110. A video amplifier 136 is coupled to the video encoder 134 and the touchscreen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 322.

Some of the above-described elements of the PCD 100 may comprise hardware, while others may comprise software, and still others may comprise a combination of hardware and software. The term "resource" is used herein to refer to any such element, whether hardware, software or a combination thereof, that is controllable by a processor. A resource may be defined in one aspect as an encapsulation of the functionality of such an element. Except where it may otherwise be indicated, the term "processor" or "master processor" is used herein to refer to a processor such as the first CPU 110A, the second CPU 110B, the analog signal processor 126, or to any other processor, controller or similar element that operates under the control of software, firmware, or similar control logic. As described in further detail below, an example of a resource is a software element that executes on a processor. A thread of execution on a processor, such as, for example, a thread relating to an executing application program, may access a resource by causing a "request" to be issued on the resource.

In different application states, it may be necessary or desirable for a processor to request different configurations or states of resources. For example, a bus resource may control the speed of a bus clock. In one application state a processor may request a bus clock that allows the processor to operate at a rate of, for example, 100 million instructions per second (MIPS), while in another application state the processor may request a bus clock that allows it to operate at a rate of, for example, 150 MIPS. In the case of a processor preparing to enter an application state that is a sleep state, the processor may request a bus clock of zero MIPS. Similarly, in one application state defined by a processor executing a first application program the processor may request 100 MIPS, while in another application state defined by the processor executing a second application program the processor may request 150 MIPS. Likewise, in one application state defined by a processor concurrently executing a certain number of application programs the processor may request 100 MIPS, while in a second application state defined by the processor concurrently executing a different number of application programs the processor may request 150 MIPS. It should be understood that the above-referenced bus clock is intended only as an example of a resource that may be configured by a processor issuing a resource request, and also that the numbers "100" and "150" are intended as arbitrary examples of processing speeds.

Resource configurations or states may be grouped into resource state sets. A resource state set defines the configurations or states of one or more resources that are used together by a processor in a certain processor application state. For example, a certain resource state set may include configuration or state information for a bus clock resource to provide a processor with a certain number of MIPS of processing speed, and configuration or state information for a decoder (i.e., another example of a resource) to provide a decoding function to the processor.

Figure 2:
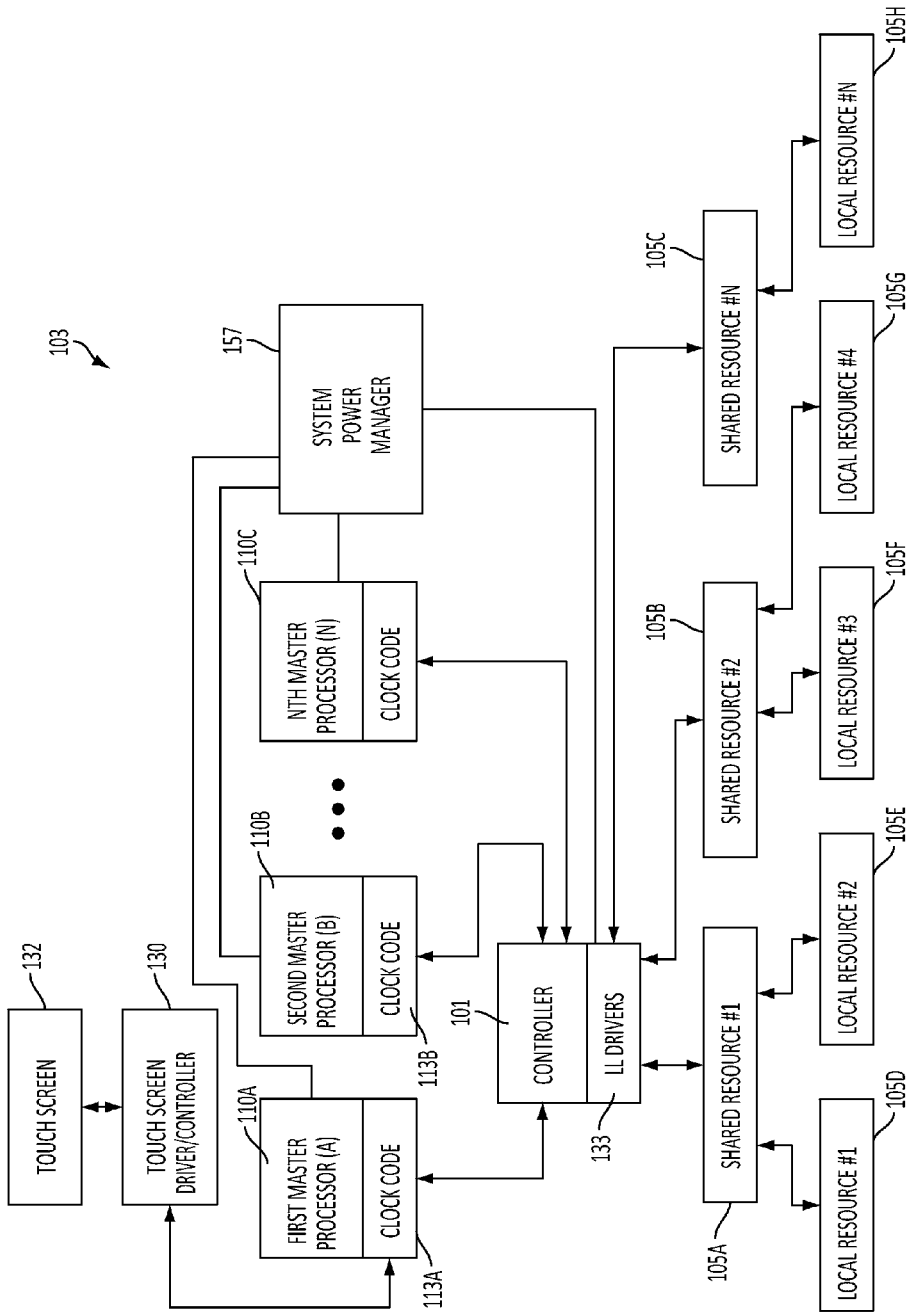
FIG. 2 is a functional block diagram illustrating relationships among a controller, a system power manager, master processors, low-level drivers, shared resources, and local resources.

FIG. 2 is a functional block diagram illustrating relationships among the controller 101, system power manager 157, master processors 110, 126, low-level drivers 133, shared resources 105A-C, and local resources 105D-H that form a system 103. FIG. 2 also illustrates how the touchscreen 132 may be coupled to the touchscreen driver/controller 130. The touchscreen driver/controller 130 may be coupled to clock code 113A of a first master processor 110A.

The system 103 may switch among resource state sets desired by a processor 110 in a manner that minimizes resource latency. The term "resource latency" refers to the delay or latency that occurs between a time at which a master processor 110, 126 begins preparing controller 101 and system power manager 157 to transition to another resource state set and the time that the resources of that set become configured to the specified states and ready for use by the processor. As described below, resource state sets may be broadly categorized into: active resource state sets, in which a processor is provided with resources configured to aid the processor in executing application programs and otherwise providing processing power; and a sleep resource state, in which a processor is provided only with resources that aid the processor in maintaining a sleep state, i.e., a state in which the processor is not executing application programs or otherwise providing processing power. Although a processor in a sleep state may maintain low-level functions, the processor does not execute software that would be understood by one of ordinary skill in the art to be an application program. It should be understood that the "next-active state" feature described below may be applied to transitions between any resource state sets, regardless of whether they may be active sets or sleep sets.

In the exemplary embodiment shown in FIG. 2, the first master processor 110A may be coupled to the system power manager 157 and the controller 101. The controller 101 may be coupled to the clock code 113A of the first master processor 110A. The controller 101 may comprise one or more low-level drivers 133. The one or more low-level drivers 133 may be responsible for communicating with one or more shared resources 105A-C. Shared resources 105A-C may comprise any type of device that supports tasks or functions of a master processor 110. Shared resources 105A-C may include devices such as clocks of other processors as well as single function elements like graphical processors, decoders, and the like.

The shared resources 105A-C may be coupled to one or more local resources 105D-H. The one or more local resources 105D-H may be similar to the shared resources 105A-C in that they may comprise any type of device that supports or aids tasks or functions of a master processor 110. Local resources 105D-H may include devices such as clocks of other processors as well as single function elements like graphical processors, decoders, and the like. The local resources 105D-H may comprise leaf nodes. Leaf nodes are understood by one of ordinary skill in the art as local resources 105D-H that usually do not refer or include other dependent resources 105.

The controller 101 may be responsible for managing requests that are issued from the one or more master processors 110, 126. For example, the controller 101 may manage a request that originates from the first master processor 110A. The first master processor 110A may issue this request in response to an operator manipulating the touchscreen 132. The touchscreen 132 may issue signals to the touchscreen driver/controller 130. The touchscreen driver/controller 130 may in turn issue signals to the clock code 113A of the first master processor 110A.

The controller 101 may also be responsible for managing the sleep states for a particular processor 110. Prior to entering a sleep state, a processor 110 will provide information for managing sleep states. Information for managing sleep states includes the entry into and exiting from a sleep state. This information for managing sleep states will be referred to below as triggers and resource states. A resource state set may include resource information for configuring one or more resources in a manner that supports a sleep state of a processor.

Triggers may define events that cause a processor 110 to either enter into a sleep state or to leave a sleep state. Triggers will generally reference resource states that are contained within or that are accessible by the controller 101. Resource states define a desired state of resources 105 needed by particular processor 110. In an exemplary embodiment, each processor 110 may provide at least two resource state sets to a controller 101: an active set of resource states and a sleep set of resource states. However, in other embodiments a processor may provide resource state sets in addition to a single active set and a single sleep set or resource state sets that are different from a single active set and a single sleep set. Such other resource state sets may correspond to one or more of the processor application states described above. That is, for any application state, the processor may provide a corresponding resource state set.

In the exemplary embodiment, the active set of resource states may define states of resources 105 for when the processor 110 is actively performing processing functions and requiring action/functions from its resources 105. The sleep set of resource states may define states of resources 105 when the processor 110 is in a sleep or idle state. Further details about triggers and resource states will be described below in connection with FIG. 3.

Figure 3:
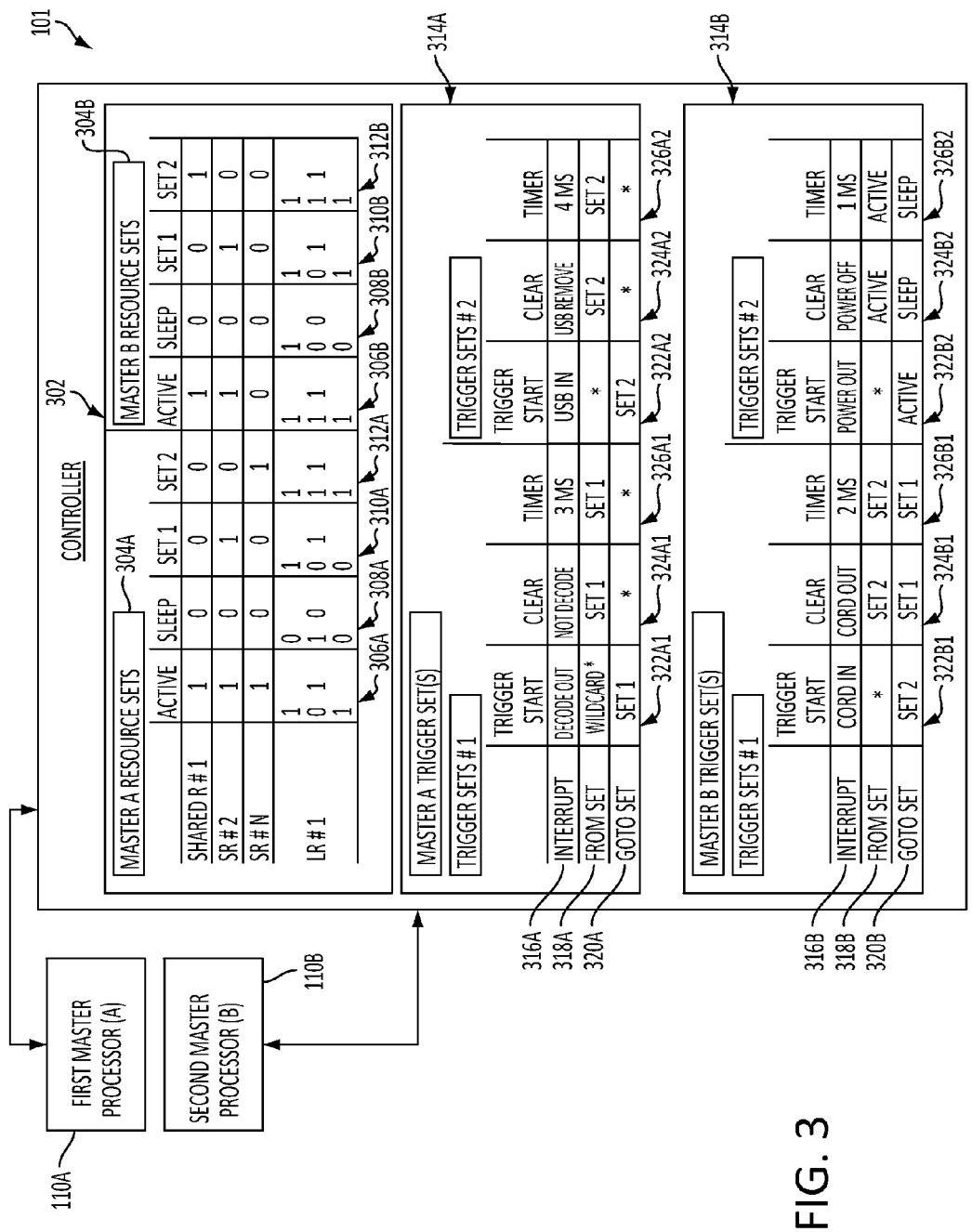
FIG. 3 is a functional block diagram illustrating details about the controller and trigger sets.

FIG. 3 is a functional block diagram illustrating details about the controller 101, resource sets 304, and trigger sets 314. As noted previously, the controller 101 may comprise software executed by one or more of the processors 110, 126 of the PCD 100. The controller 101 may store information in memory 112 or in an area within the controller 101, such as local storage as understood by one of ordinary skill in the art. This information may comprise a resource table 302 that includes resource sets 304 that are assigned to each master processor 110 which is serviced by the controller 101. This information may also comprise trigger sets 314 that are also assigned to each master processor 110 and which may be unique to each master processor 110.

Each resource set 304 generally comprises information relating to states of resources 105 desired by a particular master processor 110. Each resource set 304 assigned to a particular master processor 110 may comprise an active resource set 306, and a sleep resource set 308. The active resource set 306 may define or describe states of resources 105 when a particular master processor 110 is active or functioning normally. The sleep resource set 308 may define or describe states of resources 105 when a particular master processor is in a sleep or dormant state as understood by one of ordinary skill in the art. Each resource set 304 may also comprise additional sets such as "set 1" and "set 2" assigned to the first master processor 110 in the exemplary embodiment illustrated in FIG. 3.

As an example, the active resource set 306 for the first master processor (A) 110A as illustrated in FIG. 3 has assigned the following values for each of its resources 105: for the first shared resource (SR#1) 105A the value is one; the value for the second shared resource (SR#2) 105B is one; the value for the Nth shared resource (SR#N) 105C is one; while the four values for the first local resource (LR#1) 105D are one, zero, one, and one.

As noted previously, states of resources 105 are not limited to single values and may include a plurality of values. Further, states of resources may include any of a number of different types of parameters. For example, a state may designate hundreds of megahertz for the amount of clock speed of a particular clock that may function as a resource 105.

As another example, the sleep resource set 308A for the first master processor (A) 110A as illustrated in FIG. 3 has assigned the following values for each of its resources 105: for the first shared resource (SR#1) 105A, this resource has been assigned value of zero; the second shared resource (SR#2) 105B has an assigned value of zero; while the Nth shared resource (SR#N) 105C has an assigned value of zero.

The first local resource (LR#1) 105D may have assigned values of zero, one, zero and zero.

Each trigger set 314 assigned to a particular master processor 110 may comprise at least three fields: an interrupt field 316; a "from set" 318; and a "go to set" 320. Each of these three fields of a trigger set 314 may also include a corresponding set of three columns: a trigger start column 322; a clear column 324; and a timer column 326.

The interrupt field 316 describes the action or activity that may be generated and/or detected by the system power manager 157. The interrupt field 316 may be generally characterized as the "trigger event" that may allow a controller 101 to select a specific resource set 304 which is desired by a particular processor 110 based on the trigger event detected by the SPM 157. The selection of a resource set 304 by the controller 101 may avoid the time consuming software handshake described above in the background section.

Reviewing the first trigger set (trigger set #1) of FIG. 3 for the first master processor (A) 110A, the fields of the set are discussed in order by columns. Starting with the first column of the trigger set 314A, the trigger start column 322 has an action listed as "decode interrupt" in its first row corresponding to the interrupt field 316.

As noted previously, the interrupt field 316 may define parameters that cause the controller 101 to activate the states of a resource set 304 in response to the detection of the trigger start field 322. In the exemplary embodiment illustrated in FIG. 3, the interrupt field 316A has been defined or described as a "decode interrupt" which means that when the system power manager 110 detects a "decode interrupt," such as when a PCD 100 is decoding video, then this event may alert the controller 101 to review the "from set" field 318 in the first column 322A1 under the "trigger start" column.

The "from set" field 318 may comprise a value that denotes what the current resource set 304 should be for the particular master processor 110 being reviewed by the controller 101. This field 318 may list a resource set 304 by its identifier such as the "active set," the "sleep set," or a set number like "set 1" or "set 2," The field 320 may also comprise a "wild card" like an asterisk.

A wildcard designation in the "from set" field 318 may cause the controller 101 to retrieve the last known active resource set 304 that was being used by a particular master processor 101. In the exemplary embodiment illustrated in FIG. 3, the "from set" row 318A and trigger start column 322A1 have a value of an asterisk or wildcard.

The "go to set" 320, like the "from set" 318, may comprise a listing of a resource set 304 by its identifier such as the "active set", the "sleep set", or a set number like "set 1" or "set 2". The field 320 may also comprise a "wild card" like an asterisk that means the last resource set 304 being utilized by a processor 110. In the exemplary embodiment illustrated in FIG. 3, the "go to set" field 320A and the trigger start field column 322A1 has a value of "set 1" which is the resource set 1 listed in column 310A of the first resource set 304A.

For the example illustrated in FIG. 3, when a decode interrupt event is detected by the SPM 157, it alerts the controller 101. The controller 101 reviews the first trigger set for the first master processor 110. Since the trigger start column 322A1 lists a matching value (a decode interrupt), the controller 101 reviews the "from set" field 318A and determines that the value is a wildcard value or asterisk. The controller 101 then reviews the "go to" field 320A which has a value of "set 1" that designates a particular resource set 304A. Based on this information reviewed by the controller 101, the controller 101 will switch the current resource set 304A for the first master processor 110A from its current set to the resource set "set 1."

Resource Set 1 is listed in column 310A of the resource set 304A assigned to the first master processor 110A.

Further, when the SPM 157 or the controller 101 detects a "not decode" event such as illustrated in the clear column 324A1 of the first trigger set, then the controller 101 will then review the "from set" field 318A and determine that this value comprises "set 1." The controller 101 will then review the "go to set" field 320 which has a value of a wildcard or an asterisk in this example. This means that the controller 101 will switch the resource set 304A of the first master processor 110A from the "set 1" resource set to the last active resource set used by the processor 110A.

The timer field 326 of the trigger set may denote an amount of time that a particular resource set 304 may be used by the controller 101. So for the exemplary embodiment illustrating FIG. 3, for the timer field 326A1 of the first trigger set, this field has a value of three milliseconds. This means that when the decode interrupt event is matched with the trigger start field 322A1 of the first trigger set, then the controller 101 utilizes the resource set 304 specified in the "go to set" field 320A for only a period of three milliseconds. In other exemplary embodiments, situations may occur or exist in which there is no information in the timer field 326 or the value is defined to correspond with a value that indicates that there is no timer trigger 326 for this transition and that the transition only applies to the no decode field. In a situation in which the timer field is defined, such as illustrated in FIG. 3—timer fields 326A1 and 326A2, then whichever event occurs first between the timer field 326 and the Clear field 324 will usually initiate the transition.

FIG. 4 illustrates an exemplary active-sleep trigger set 314 for a processor 110. In this exemplary embodiment, the interrupt field 316 in the first column 322 define a "shut down" event as the action to initiate a sleep set 308 (FIG. 3) for a particular processor 110. The "shut down" event may include action like an operator selecting an on/off button for shutting down a PCD 100.

In the exemplary embodiment in FIG. 4, when a "shut down" event is detected, the controller 101 transitions the current active resource set 306 to a sleep set 308. The sleep set 308 is listed in a master resource set 304 of table 302 in FIG. 3.

When the controller 101 receives a message from the SPM 157 that a "bring up" event has occurred, such as a power-on event initiated by an operator of the PCD 100, then the controller would transition the processor 110 from its sleep set 308 to the last active resource set 304 based on the wildcard or asterisk value listed in the "go to set" field 320 of the trigger set 314.

As described above, the system 103 is not limited to active and sleep sets 306, 308. The system 103 may be used for switching between resource sets 304 for events other than entering or exiting sleep states as illustrated in FIG. 3.

Figure 5:
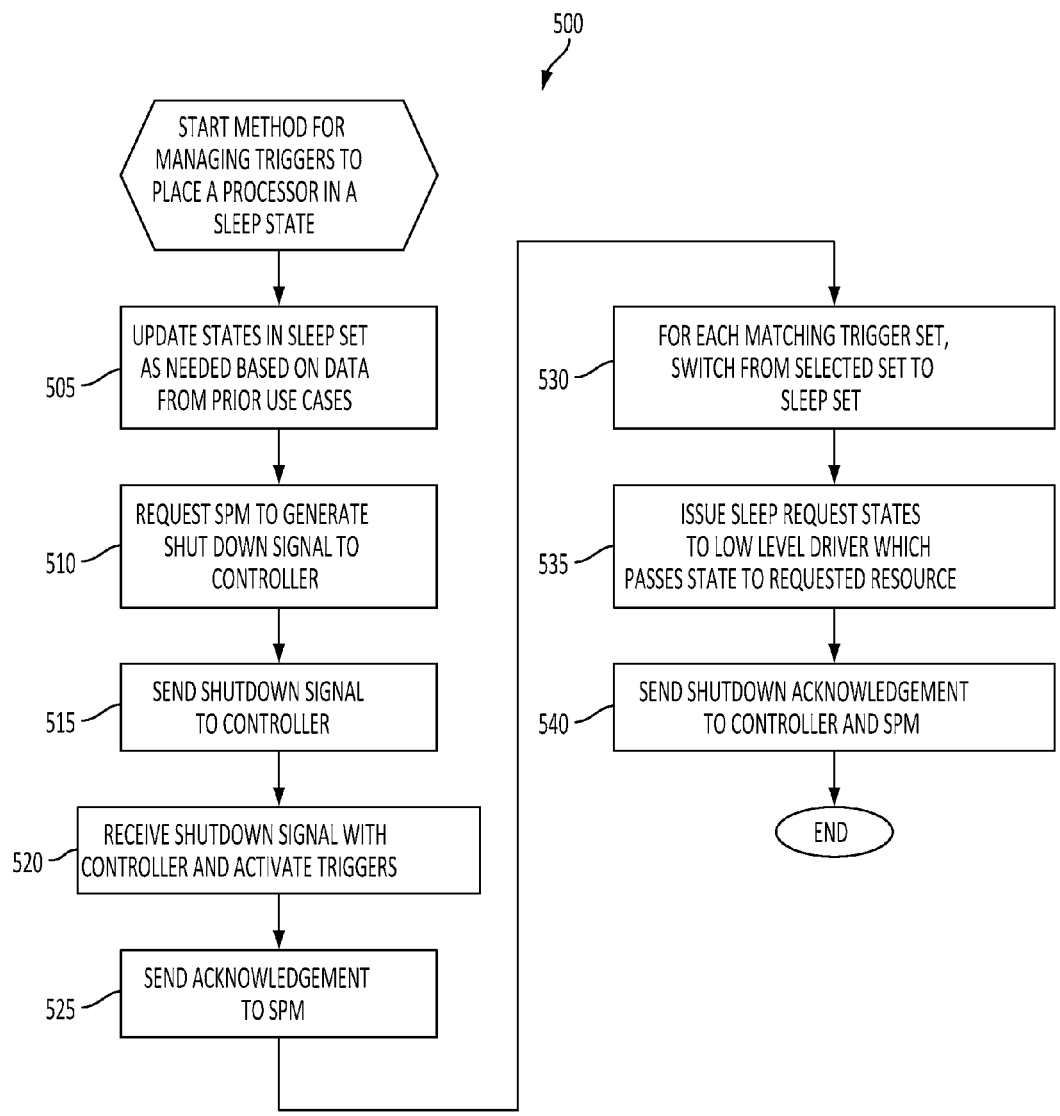
FIG. 5 is a logical flowchart illustrating a method for managing trigger sets and otherwise transitioning a processor from a first application state, such as an awake state to a second application state, such as a sleep state.

FIG. 5 is a logical flowchart illustrating a method 500 for managing trigger sets 314 to place a processor 110 into a sleep state. Block 505 is the first step of the method 500. In block 505, each processor 110 may update its resource sets 304 as well as its trigger sets 314 in the controller 101 (FIGS. 1-2) as needed based on data from prior use cases of the PCD 100.

In block 510, a processor 110 may request the SPM 157 (FIG. 2) to generate a shutdown signal to the controller 101. In block 515, the SPM 157 may send the shutdown signal to the controller 101.

The controller 101 may receive the shutdown signal in block 520 and activate the trigger sets 314 which may be assigned to a shutdown event as illustrated in FIG. 4. In the exemplary embodiment illustrated in FIG. 4, the shutdown signal is matched against the interrupt field 316 of the trigger set 314. The trigger set 314 directs the controller 101 to access a sleep set 308 as indicated in the "go to set" field 320. In block 525, the controller 101 may immediately send an acknowledgment signal to the SPM 157 while the controller 101 continues to activate resource sets 304 that are referenced by the trigger sets 314 which match the shutdown signal event.

In block 530, for each matching trigger set 314, such as the matching trigger set 314 listing the "shutdown" event in the corresponding interrupt field 316 illustrated in FIG. 4, the controller 101 may switch the current resource set 304 to a sleep set 308, such as the sleep set 308A of the first resource set 305A for the master processor 110A of FIG. 3.

Next, in block 535, the controller 101 may issue sleep request states to low-level drivers 133 such as illustrated in FIG. 2. The low-level drivers 133 may pass the requested states to the corresponding resources 105.

In block 540, each resource 105 may issue a shutdown signal acknowledgment to the controller 101 and the SPM 157. The method 500 may then end.

Figure 6:
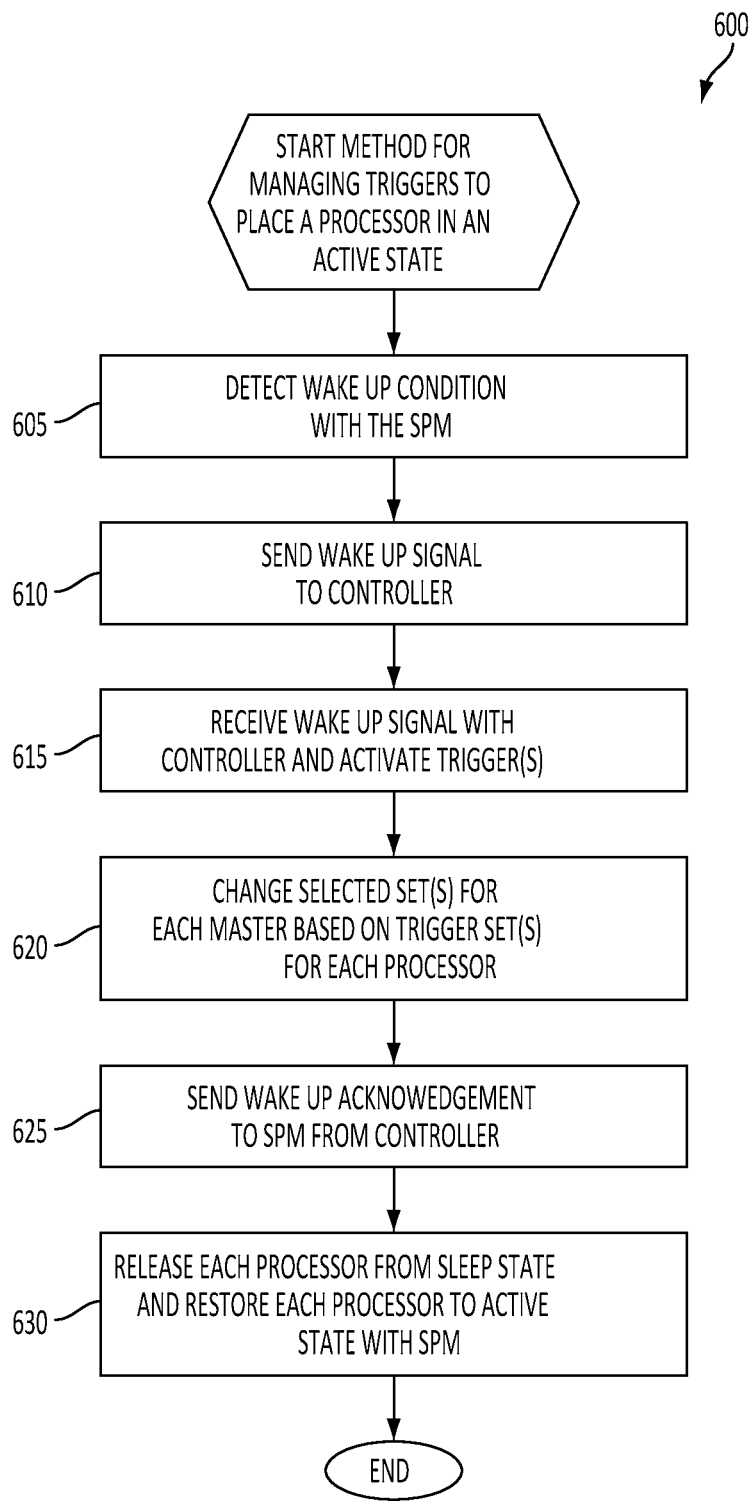
FIG. 6 is a logical flowchart illustrating a method for managing triggers sets and otherwise transitioning a processor from the second application state, such as a sleep state to a third application state, such as an awake state.

FIG. 6 is a logical flowchart illustrating a method 600 for managing trigger sets 314 to place a processor 110 in an active state from a sleep state. Block 605 is the first step in method 600. In block 605, a wake-up condition or wake-up event is detected with the SPM 157, or the wake-up event is detected directly by the controller 101, which may have its own interrupt controller (not illustrated). Exemplary embodiments may be designed such that wakeup interrupts may not be detectable by the SPM 157. In such exemplary embodiments, the controller 101 may use its interrupt controller to detect them and have these "mapped" to sleep set requirements for a master processor 110.

Next, in block 610 the SPM 157 may send a wake-up signal to the controller 101. In block 615, the controller 101 may receive the wake-up signal from the SPM 157 and activate one or more trigger sets 314 that matched the wake-up signal. For example, the controller 101 may match the wake-up signal with the "bring up" event listed in the interrupt field 316 in the "active" column of the trigger set 314 of FIG. 4. In the exemplary embodiment of FIG. 4, the "go to field' 320 in the active column 324 directs the controller to the last resource set 304 which was used by the current processor 110.

So in block 620, the controller 101 would change the current resource set 304 for a processor 110 based on this matching trigger set 314. One of ordinary skill in the art recognizes that the controller 101 will cycle through all of its trigger sets that it maintains as illustrated in FIG. 3.

Next, in block 625, the controller 101 may send a wake-up acknowledgment to the SPM 157 identifying which master processors 110 have been awakened from the sleep state. Next, in block 630, each processor 110 with a matching wake up trigger set 314 is released from a sleep state and restored to its active state with power supplied by the SPM 157. The method 600 then ends.

FIGS. 7-10 illustrate another feature, which is referred to in this description as "next-active resource state set" or "next-active set." One example of a next-active set is a next-awake set. The next-awake set or other next-active set may be used in the same manner described above with regard to FIG. 6 and the resource set 304 to which the controller 101 switches upon a wake-up event.

Figure 7:
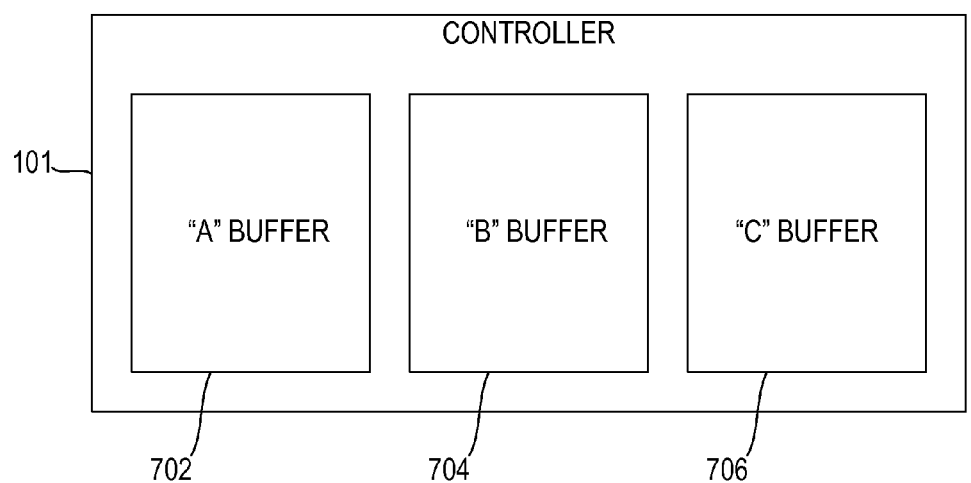
FIG. 7 is a functional block diagram of controller buffer memory.

FIG. 7 is similar to FIG. 3 in that it represents information stored in the controller 101. In an exemplary embodiment, the controller 101 may include three memory buffers, referred to in this description for convenience as the "A" memory buffer 702, the "B" memory buffer 704, and the "C" memory buffer 706.

Figure 8:
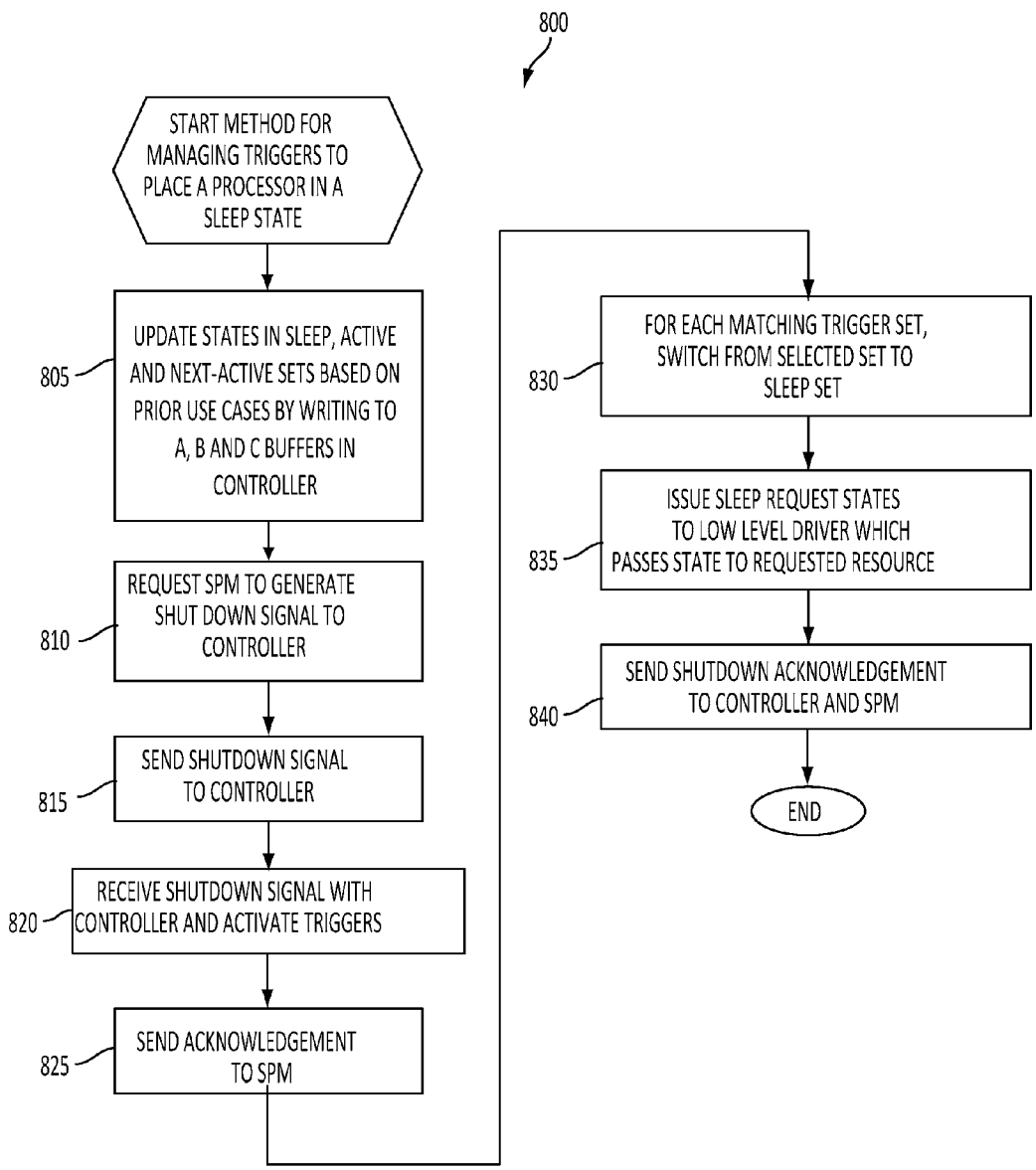
FIG. 8 is a logical flowchart illustrating an alternative method for transitioning a processor from a first application state, such as an awake state, to a second application state, such as a sleep state.

FIG. 8 is a logical flowchart similar to FIG. 5 in that it illustrates a method 800 for placing a processor into a sleep state. Block 805 is the first step of the method 800 and is similar to block 505 described above with regard to FIG. 5. Block 805 indicates that processor 110 may update not only an active or awake resource state set and a sleep resource state set but also a next-awake resource state set. As shown in FIG. 8, the processor may cause the active set to be stored in the "A" buffer 702 (FIG. 7) of the controller 101, the sleep set to be stored in the "B" buffer 704 (FIG. 7) of the controller 101, and the next-awake set to be stored in the "C" buffer 706 (FIG. 7) of the controller 101. Other aspects of block 805 are the same as described above with regard to block 505 (FIG. 5) and are therefore not described here.

Blocks 810, 815, 820, 825, 830, 835 and 840 are the same as blocks 510, 515, 520, 525, 530, 535 and 540, respectively, of FIG. 5 and are therefore not described here. Note that when the processor begins shutting down, it is in the awake application state corresponding to the awake set stored in the "A" buffer 702 (FIG. 7). The processor then enters the sleep application state corresponding to the sleep set that is stored in the "B" buffer 704 (FIG. 7) in the same way as described above with regard to FIG. 5. The processor awakes (FIG. 6) from the sleep application state in the next-awake application state corresponding to the next-awake set that is stored in the "C" buffer 706 (FIG. 7). By pre-storing the next-awake set updates in the "C" buffer 706 (FIG. 7) and applying them as soon as possible, the controller 101 may immediately begin configuring the resources specified by that next-awake set upon a wake-up event, thereby helping to minimize resource latency.

Figure 9:
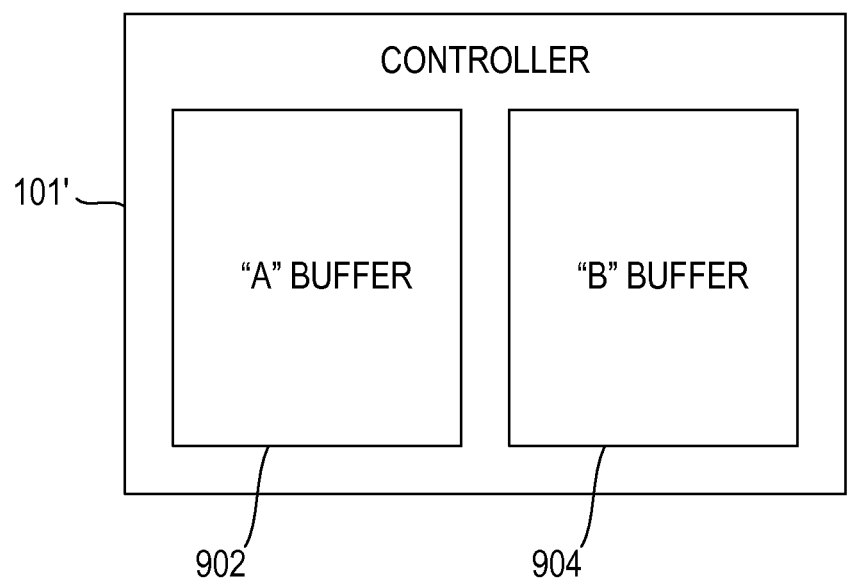
FIG. 9 is a functional block diagram of an alternative controller buffer memory.

FIG. 9 relates to another exemplary embodiment, in which the controller 101 does not have sufficient memory to simultaneously store all three of the above-described resource state sets. In this embodiment, the controller 101' has only an "A" buffer 902 and a "B" buffer 904, and there is no memory space available for a "C" buffer. In such an instance, the "A" buffer 902 is re-used so that at different times it stores the (then-current) awake set as well as the next-awake set.

Figure 10:
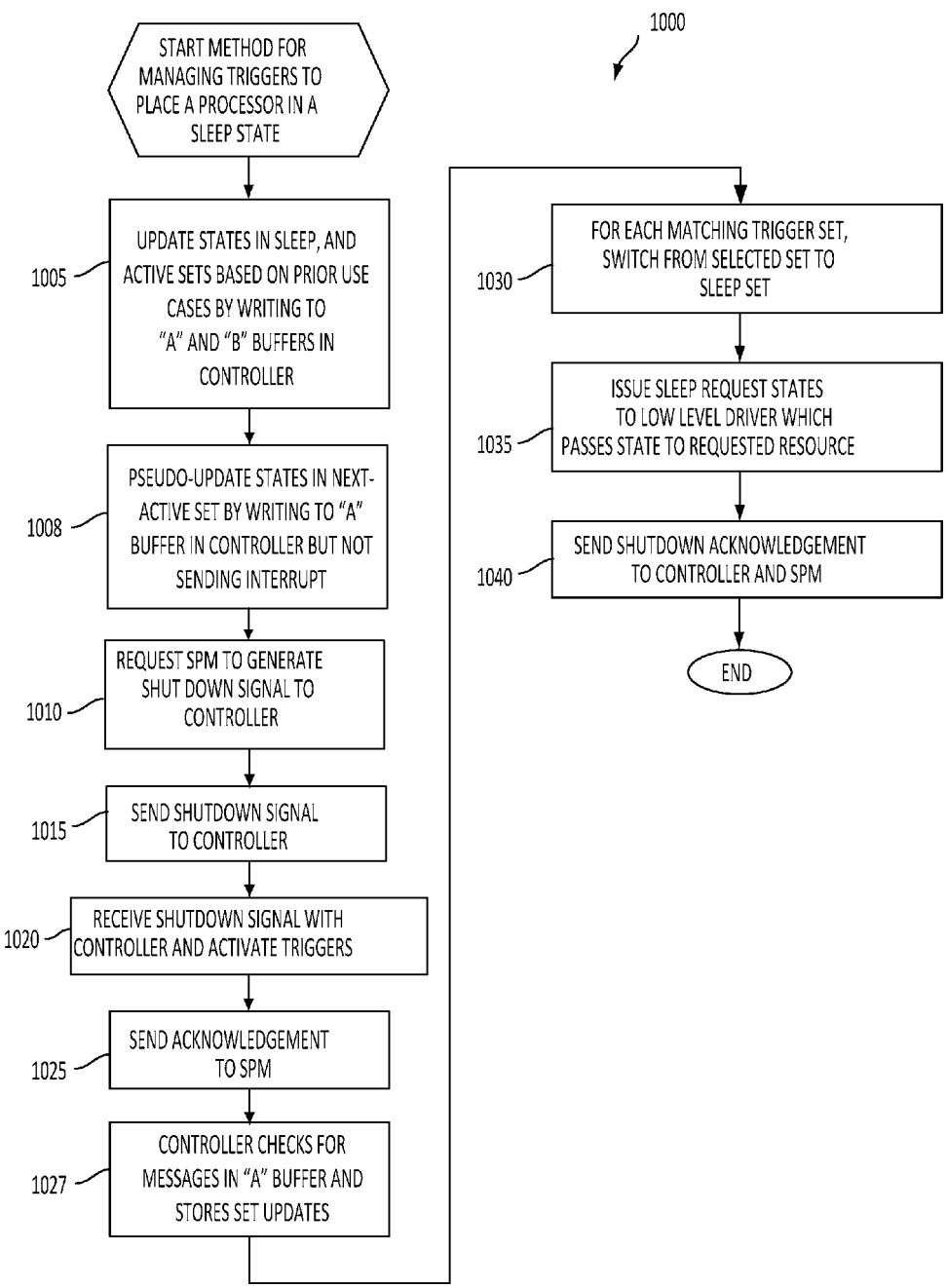
FIG. 10 is a logical flowchart illustrating another alternative method for transitioning a processor from a first application state, such as an awake state, to a second application state, such as a sleep state.

FIG. 10 is a logical flowchart similar to FIGS. 5 and 9 in that it illustrates a method 1000 for placing a processor into a sleep state. Block 1005 is the first step of the method 800 and is similar to block 805 described above with regard to FIG. 8 but does not include storing the next-awake set in a "C" buffer. Rather, the processor may cause the active set to be stored in the "A" buffer 902 (FIG. 9) of the controller 101' and the sleep set to be stored in the "B" buffer 904 (FIG. 9) of the controller 101', but the processor waits until after it has reached a "point of no return" (as the term is understood by one of ordinary skill in the art) in transitioning to the sleep application states before re-using the "A" buffer to store the next-awake set. Other aspects of block 1005 are the same as described above with regard to block 505 (FIG. 5) and are therefore not described here.

In block 1008, the processor performs what may be referred to as a pseudo-update or virtual update of the next-awake set. Note that in the above-described block 1005 the processor may perform actual updates of resource state sets by writing the resource state sets to the "A" buffer 902 and "B" buffer 904 in the controller 101'. The updates are actual because the controller 101' receives an interrupt from the processor to notify it that the buffer contents have been updated, causing the controller 101' to act upon or apply the updates. The controller 101' applies the updates by performing various tasks that may be necessary to prepare the updated resource state set information for use. If the sleep set in buffer "B" is updated, the controller 101' may prepare the updated sleep set information for use in case a shutdown event or similar event that requires switching resource state sets subsequently occurs. If the active set in "A" buffer 902 is updated, the controller 101' may cause the resources to be adjusted accordingly. The pseudo-update that the processor performs in block 1008 includes storing updates for the next-awake set in "A" buffer 902 (FIG. 9) without sending an interrupt to the controller 101'. Because the controller 101' receives no interrupt, it does not yet apply the updates that occurred in "A" buffer 902 (FIG. 9). This pseudo-update occurs after a point of no return in which the processor 110 will request SPM 157 (FIG. 2) to signal a shutdown to the controller 101' and is assured not to make any further updates to the then-active resource set state information in the "A" buffer 902.

Blocks 1010, 1015, 1020 and 1025 are the same as described above with regard to blocks 510, 515, 520 and 525, respectively, of FIG. 5 and are therefore not described here.

Then, in block 1027 the controller 101' responds to the handshake that occurs between it and the processor (blocks 1020, 1025) by checking the "A" buffer 902 (FIG. 9) for updates and stores the updates to be used in the wake-up method of FIG. 6. (It may be noted that the memory buffers are also referred to as "message RAM" due to the way an interrupt is used to notify the recipient controller 101' of "messages" that the processor has written to the buffers.) Thus, by pre-storing the next-awake set in the "A" buffer 902 (FIG. 9), the controller 101' is able to immediately begin configuring the resources specified by that next-awake set upon a wake-up event, thereby helping to minimize resource latency.

Blocks 1030, 1035 and 1040 are the same as blocks 530, 535 and 540, respectively, of FIG. 5 and are therefore not described here. The processor then accordingly enters the sleep application state corresponding to the sleep set that is stored in the "B" buffer 904 (FIG. 9) in the same way as described above with regard to FIG. 5. The processor awakes (FIG. 6) from the sleep application state in the next-awake application state corresponding to the next-awake set that is stored in the "B" buffer 904 (FIG. 9). By pre-storing the next-awake set and applying it as soon as possible, the controller 101' is able to immediately begin configuring the resources specified by that next-awake set upon a wake-up event, thereby helping to minimize resource latency.

FIGS. 11-23 illustrate another feature, which relates to scheduling the above-described resource set transitions. One of ordinary skill in the art understands that in many instances the above-described changes in processor application program state may occur with a relatively predictable periodicity. For example, in PCD 100 (FIG. 1) it may be necessary for a processor executing a video player application program to wake up in or otherwise transition to a state in which the processor may decode a frame of video data on a periodic basis (e.g., every X milliseconds). Similarly, it may be necessary for a processor controlling a cellular telephone function of PCD 100 to, for example, wake up in or otherwise transition to a state in which the processor may check for an RF communications signal on a periodic basis (e.g., every X milliseconds). Since the times at which a periodic change in application program state is to occur may be predicted, and since the amount of time necessary for the resources to complete transitioning to the states corresponding to the next application program state are substantially fixed or constant, the time at which it is necessary to begin the process of switching resource state sets may be predicted. For example, it may be predicted that a processor needs to have a set of resources in states indicated by an exemplary resource state set ("R") at time $t_{deadline}$. This exemplary resource state set "R" may specify that a bus clock resource is to change to, for example, 100 MHz and a power supply resource is to change to, for example, 3 V. The amount of time ("work_time") that it will take for the controller 101 to ensure that the bus clock resource and power supply resource have completed these transitions may be determined. (The term "work" refers to the processing, configuring and hardware control that the controller 101 must perform in order to effect the resource state transitions.) Accordingly, in order for the resources to be in the states indicated by resource state set "R" by the time $t_{deadline}$, in this example the controller 101 needs to start the process of transitioning the bus clock and power supply resources (e.g., steps 530 and 535 in FIG. 5, steps 830 and 835 in FIG. 8, etc.) by an amount of time before $t_{deadline}$ at least equal to work_time.

In PCD 100, two or more processors (e.g., master processors 110A, 110B, 110C, etc., in FIG. 2) may request resource state set transitions at times that are very close to each other, such that the controller 101 would need to work on transitioning the resources for one processor while simultaneously working on transitioning the resources for another processor. Similarly, another element such as the SPM 157 may request a resource state set transition while the controller 101 is working on transitioning resources or scheduled to work on transitioning resources. Such "conflict" conditions are undesirable because, in the exemplary embodiment, the controller 101 is not able to perform these tasks simultaneously.

FIG. 11 is a timeline that illustrates an example of the above-described conflict condition. The approximate time at which the controller 100 begins the scheduling method described below and detects the conflict condition is labeled "$t_{now}$." In the example shown in FIG. 11, the controller 101 determines that in order for the resources to be in the states required by a first processor at time $t_{deadline\_0}$, the controller 101 needs to start the process or work ("work_0") of transitioning these resources into the required states at time $t_{start\_0}$. Similarly, the controller 101 determines that in order for the resources to be in the states required by a second processor at time $t_{deadline\_1}$, the controller 101 needs to start the process or work ("work_1") of transitioning these resources into the required states at time $t_{start\_1}$. It may be noted that the overlap between work_0 and work_1 represents a conflict condition.

In addition to managing this conflict condition, the controller 101 may also calculate accurate estimates for the work ("work_0" and "work_1")—the actual length/duration/time for the arrows representing the work illustrated in FIG. 11. Further details of how the controller 101 calculates accurate estimates for the work will be described below in connection with FIGS. 24-31.

FIG. 12 illustrates in timeline form a method for alleviating the conflict condition shown in FIG. 11. To alleviate the conflict, the controller may schedule work_0 to be completed before beginning work_1. The controller 101 thus computes a modified time $t_{start\_0}'$ at which it is to start transitioning these resources into the required states in order to complete work_0 before $t_{start\_1}$ (i.e., a modified deadline time $t_{deadline\_0}'$):

$t_{start\_0}' = t_{deadline\_0} - (t_{deadline\_1} - \text{work}\_1)$.

It may be noted that $t_{start\_0}'$ in the above calculation is relative to $t_{now}$. This computation of the modified time $t_{start\_0}'$ for the controller 101 at which it is to start transitioning these resources into the required states in order to complete work_0 before $t_{start\_1}$ (i.e., a modified deadline time $t_{deadline\_0}'$) is further enhanced by the accurate workload estimates made by the controller 101 as described below in connection with FIGS. 24-31. FIGS. 24-31 show how the controller 101 may calculate the actual length/duration/time for the arrows representing the work illustrated in FIGS. 11-12.

Figure 13:
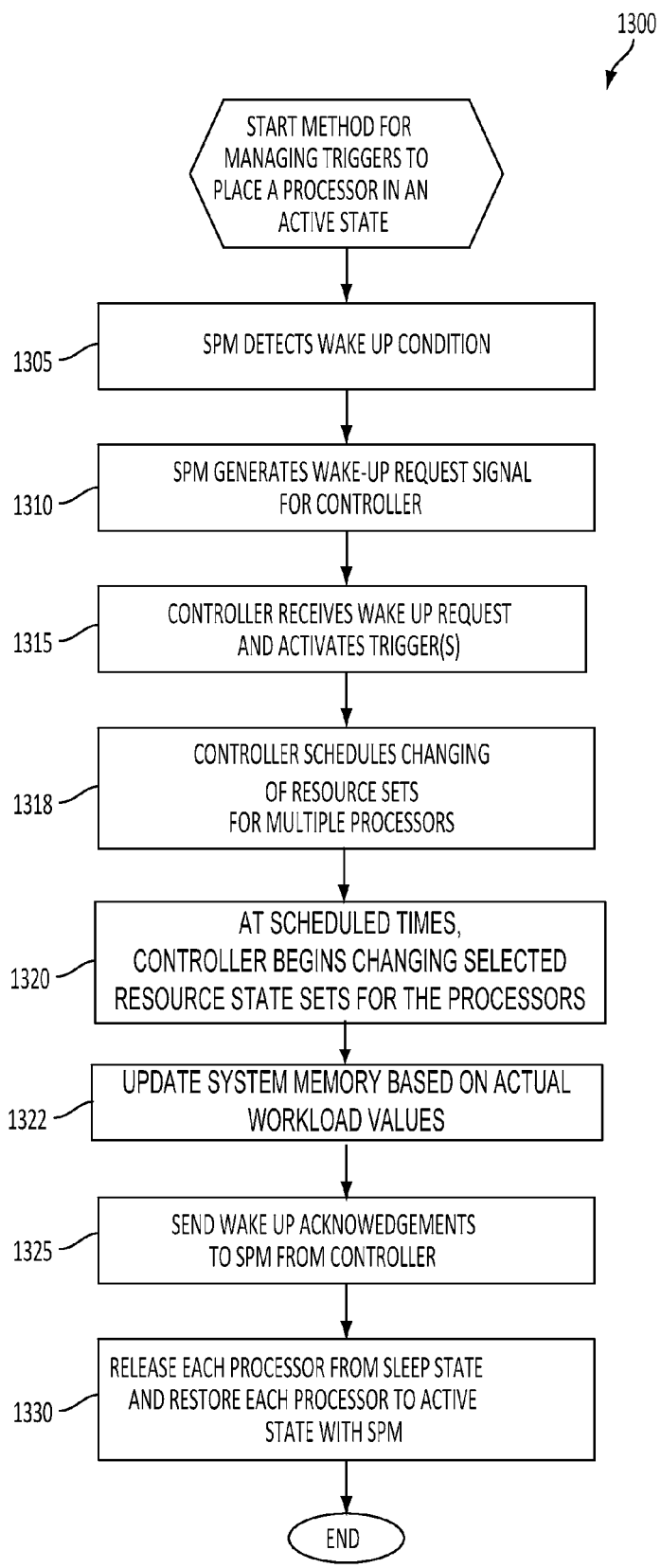
FIG. 13 is a logical flowchart similar to FIG. 6 illustrating a method for transitioning a processor from a sleep application state to an awake application state, including scheduling the processes of changing resource states.

FIG. 13 is a logical flowchart illustrating a method 1300 for transitioning a processor 110 from a sleep application state corresponding to a sleep resource state set to an active application state corresponding to an active resource state set. Method 1300 is similar to the above-described method 600 of FIG. 6 except that method 1300 includes scheduling the processing or work that the controller 101 performs to change or transition the resource states. As blocks 1305, 1310 and 1315 are the same as blocks 605, 610 and 615, respectively, of FIG. 6 they are not described here. In block 1318, the controller 101 schedules the resource state set transitions for one or more processors that the controller 101 determines are to change application states on a periodic basis.

As described above, a predicted change in application state has an associated deadline by which the resources of a resource set corresponding to the next application state are to be fully transitioned. This scheduling step may include computing the amount of time ("work") that a resource state set transition will take to complete and thus the time at which it is necessary for the controller 101 to start the transition process or "work" in order to complete the transition by the deadline. This scheduling step may also include alleviating any scheduling conflicts in the manner described above or using alternative methods. As blocks 1320, 1325 and 1330 are the same as block 620, 625 and 630, respectively, they are not described here. However, a block 1322 is provided between blocks 1320 and 1325 in which a system state cache 2705 is updated by the controller 101 based on actual workload values. Further details of block 1322 will be described below in connection with FIG. 27B.

Figure 14:
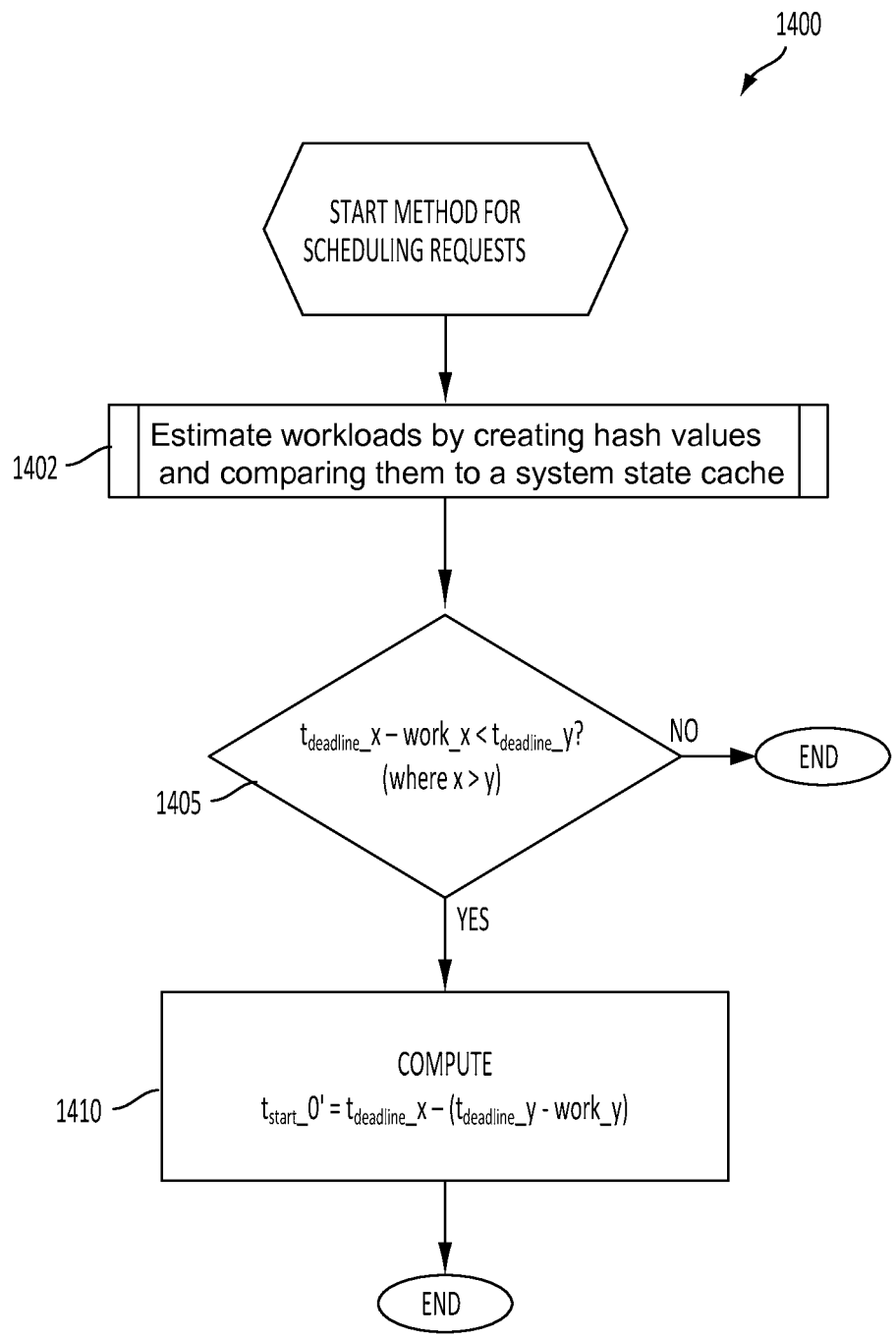
FIG. 14 is a logical flowchart illustrating a method for alleviating a conflict condition in scheduling the processes of changing resource states.

FIG. 14 is a logical flowchart illustrating a method 1400 that may be included in block 1318 of FIG. 13 to schedule resource state set transitions. Routine or sub-method Block 1402 may comprise estimating workloads by creating hash values and comparing them to a system state cache 2705 with the controller 101 as illustrated in FIG. 27B. Further details of routine or submethod Block 1402 will be described in further detail in connection with FIGS. 27 and 31 described below. Block 1405 indicates that the controller 101 may evaluate the following expression:

$t_{deadline\_x} - \text{work}\_x < t_{deadline\_y}$, where x and y are indices representing two requests for resource state transitions (e.g., from a first processor X and a second processor y), and where x>y.

If the expression evaluates to false, then there is no conflict condition between the two requests, and the method ends. If the expression evaluates to true, then there is a conflict condition of the type described above with regard to FIG. 11. If it is determined that a conflict condition exists, then the controller 101 may compute a modified start time to alleviate the conflict in Block 1410:

$t_{start\_x}' = t_{deadline\_x} - (t_{deadline\_y} - \text{work}\_y)$.

The controller 101 may substitute the modified start time for the originally scheduled resource state set transition start time.

Methods for alleviating scheduling conflicts may also take into account non-scheduled resource state set transition requests. As described above, scheduled resource state set transition requests include those that occur on a periodic basis or are otherwise predictable. Non-scheduled resource state set transition requests may occur as a result of unpredictable events, such as a user performing an action using touchscreen 132 (FIG. 2) that causes PCD 100 to wake up one or more processors. A non-scheduled request has no associated deadline time ("$t_{deadline}$") by which a resource state set transition must be complete. Rather, it is only relevant to refer to a time ("$t_{done}$") at which the resource state set transition will be complete if started at a particular time.

Figure 15:
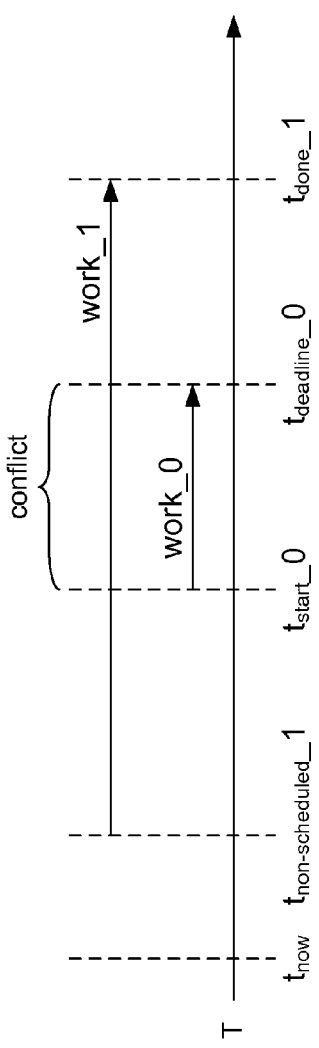
FIG. 15 is a timeline indicating a conflict condition between processing associated with a scheduled request and a non-scheduled request.

FIG. 15 is a timeline illustrating that a conflict condition may occur if the controller 101 begins processing, i.e., working on, a non-scheduled resource state set transition request as soon as the request occurs at $t_{non\text{-}scheduled\_}1$ and continues working on the request until the resource state set transition is completed at $t_{done\_}1$. Note that the processing ("work_0") of the scheduled request that begins at $t_{start\_}0$ and ends at $t_{deadline\_}0$ overlaps the processing ("work_1") of the non-scheduled request.

Figure 16:
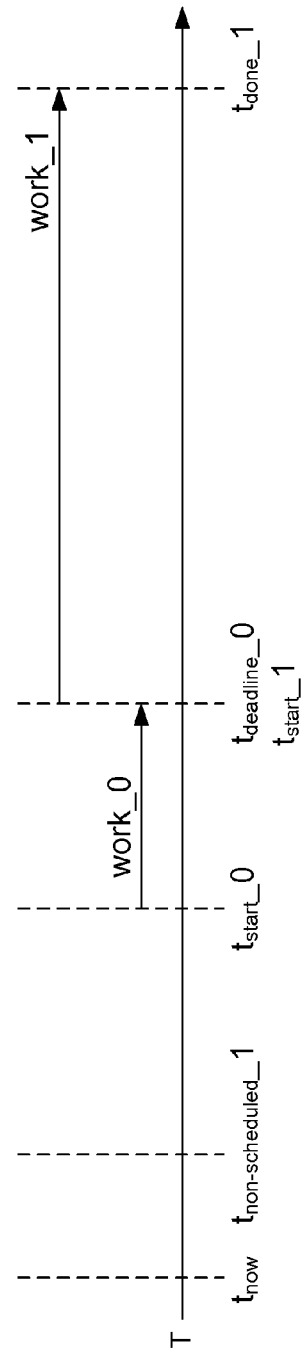
FIG. 16 is a timeline indicating a resulting of an exemplary method for alleviating the conflict condition of FIG. 15.

FIG. 16 is a timeline illustrating a straightforward exemplary method for alleviating the conflict condition of FIG. 15. To alleviate the conflict condition, the controller 101 may first transition the resources associated with the scheduled request and then transition the resources associated with the non-scheduled request.

FIG. 17 is a timeline illustrating a second straightforward exemplary method for alleviating the conflict condition of FIG. 15. To alleviate the conflict condition, the controller 101 may first transition the resources associated with the scheduled request, and then transition the resources associated with the non-scheduled request. However unlike the method shown in FIG. 16, the start of work_0, $t_{start\_}0$, is moved earlier, to $t_{start\_}0'$, to allow work_1 to complete sooner to avoid delay to the non-scheduled work.

FIG. 18 is a timeline illustrating another exemplary method for alleviating the conflict condition of FIG. 15. To alleviate the conflict condition, the controller 101 may first compute a modified start time:

$$t_{start\_}1=(t_{deadline\_}0-\text{work}\_0)-t_{now}.$$

The controller 101 may begin a subset or portion of the work of transitioning the resources associated with the non-scheduled request at the modified start time $t_{start\_}1$. Then, at $t_{start\_}0$, the controller 101 stops working on transitioning the resources associated with the non-scheduled request and instead switches to transitioning the resources associated with the scheduled request. After the controller 101 completes transitioning the resources associated with the scheduled request at $t_{deadline\_}0$, the controller 101 may return to the work of transitioning resources associated with the non-scheduled request.

Figure 19:
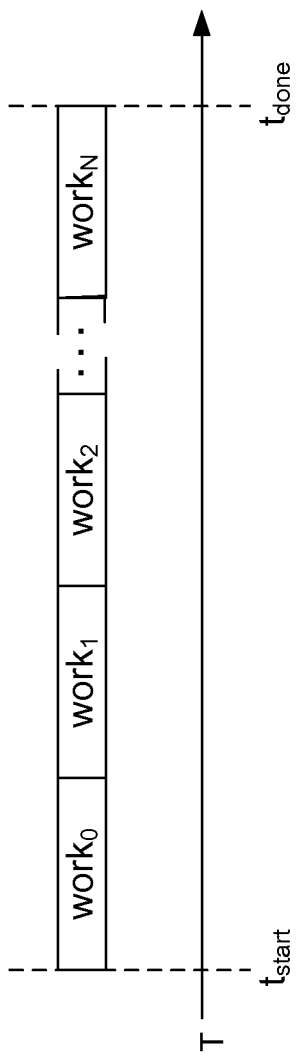
FIG. 19 is a timeline illustrating portions of the processing or work associated with transitioning to a resource state set.

FIG. 19 illustrates that the work or processing involved in transitioning resources associated with a resource state set change request may, in many instances, be divided into subsets or portions, "work_0" through "work_N." The work or processing involved in transitioning resources associated with a resource state set change may involve many discrete tasks. Thus, the controller 101 readily may be able to temporarily suspend the process of transitioning to another resource state set between such discrete tasks. For example, the portion of the processing or work that occurs between $t_{start\_}1$ and $t_{start\_}0$ in FIG. 18 may comprise one or more such discrete tasks.

Figure 20:
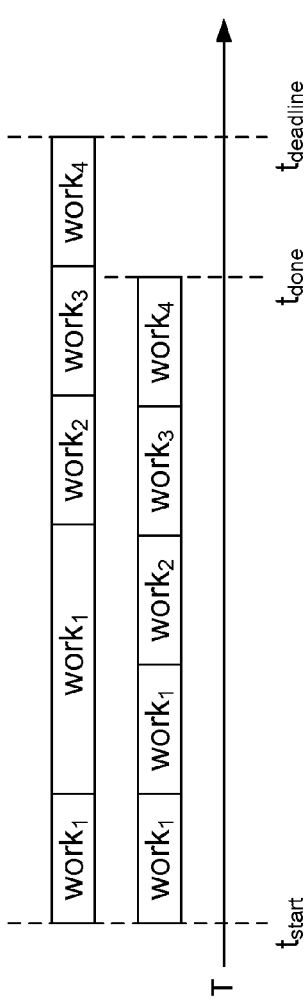
FIG. 20 is a timeline indicating a wasted power condition when actual work is complete quicker than expected.

FIG. 20 is a timeline illustrating that a subset or portion of work can complete earlier than expected, resulting in finishing the work, $t_{done}$, earlier than the deadline, $t_{deadline}$. This could result in wasted power as the result of the resource(s) involved in the work consuming power earlier than is required to meet the deadline (as understood by one of ordinary skill in the art).

Figure 21:
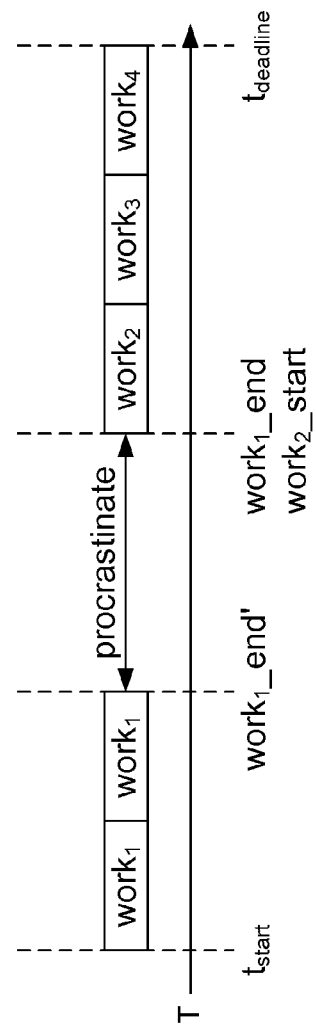
FIG. 21 is a timeline indicating a resulting of an exemplary method for alleviating the wasted power condition of FIG. 20.

FIG. 21 illustrates an exemplary method for alleviating the wasted power condition of FIG. 20. To alleviate the condition, the subsequent subset or portion of work after the subset or portion of work that completed early can be delayed or "procrastinated." The "work$_{N+1}$" can be delayed until the expected completion of "work$_N$" in order to avoid the power impact as the result of changing the resource(s) in work after "work$_N$".

Figure 22:
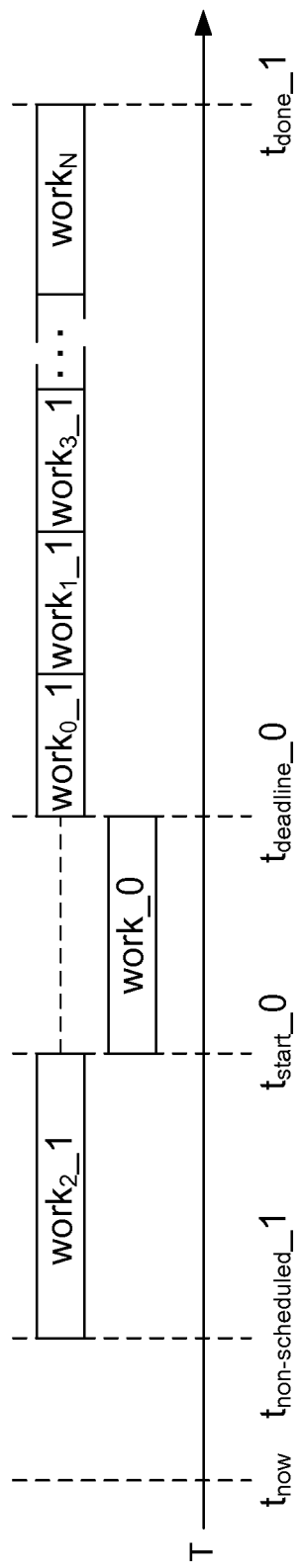
FIG. 22 is a timeline similar to FIG. 17, showing portions of the work.

FIG. 22 illustrates the discrete task concept more fully and shows that, for example, a portion work$_2$_1 may be performed between $t_{start\_}1$ and $t_{start\_}0$. It should be noted that, since some of the discrete tasks involved in transitioning the resources of a resource state set do not depend on others, such tasks may be performed in any suitable order. Thus, for example, even though the work may be shown in FIG. 19 as involving sequential tasks, there may be no adverse consequences in some instances of performing tasks out sequence, such as performing work$_2$_1 before work$_0$_1. It should also be noted that the discrete tasks or portions may not be of equal length as each other. Therefore, if one of the discrete tasks or portions, such as work$_2$_1, fits the time interval between $t_{start\_}1$ and $t_{start\_}0$ in the example shown in FIG. 22 better than other portions of that resource state set transition, then the controller 101 may optimize the method by performing the portions in such an order. In general, it may be desirable to perform the most work possible on the resource state set transition as soon as possible. Therefore, it may be more desirable to perform a longer portion that just fits the time interval between $t_{start\_}1$ and $t_{start\_}0$ in the example shown in FIG. 22 than to perform a shorter portion in that interval and thus leave a gap with no work performed just before $t_{start\_}0$.

Figure 23:
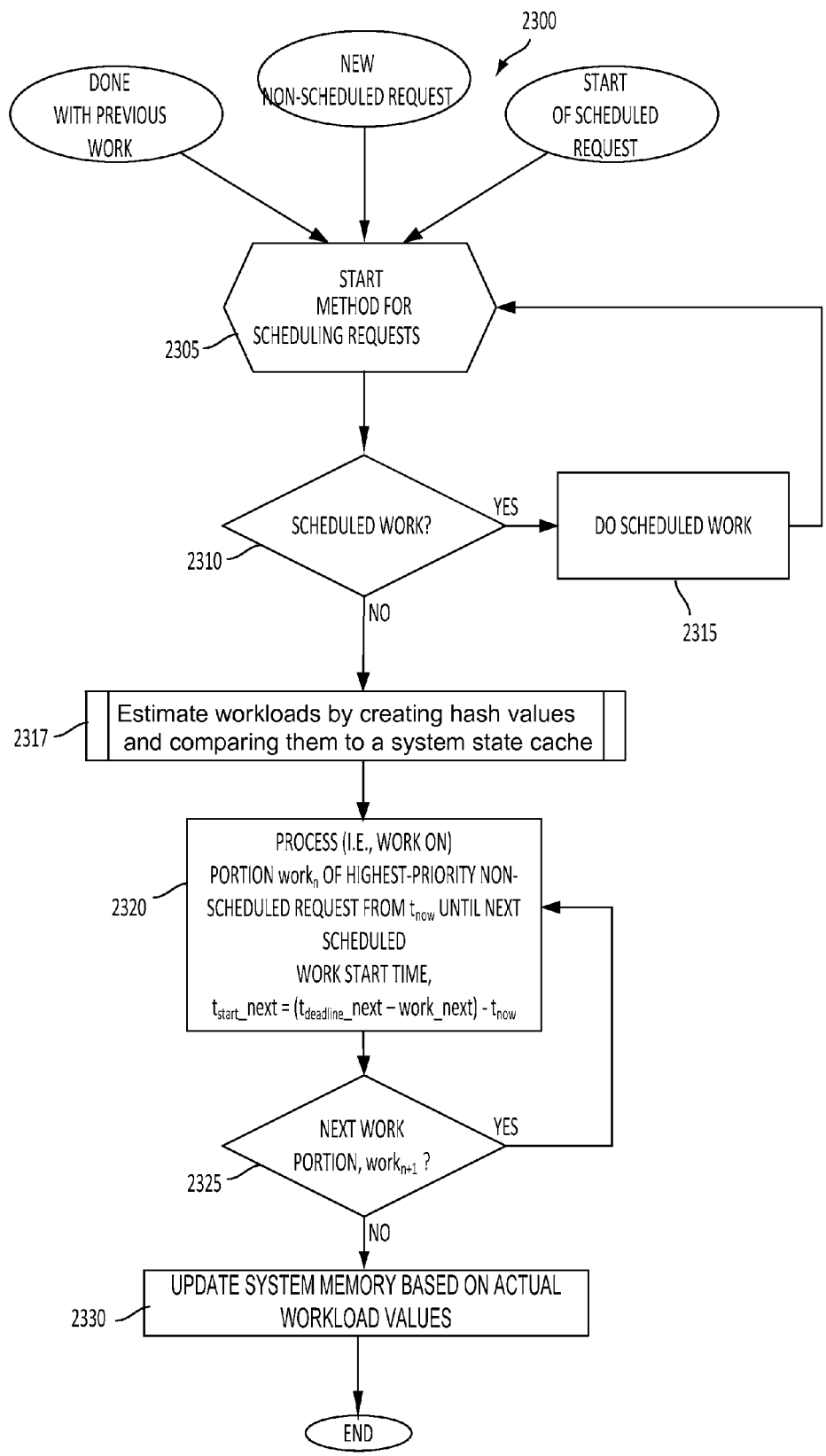
FIG. 23 is a logical flowchart illustrating a method for scheduling the processes associated with handling multiple requests for resource state set transitions.

FIG. 23 is a logical flowchart illustrating a method 2300 for scheduling the processing of resource state transitions. The method 2300 conveys more generally the concept that more than two requests, which may be scheduled or non-scheduled, may need to be processed concurrently. (For purposes of clarity, the methods described above with regard to FIGS. 11-22 relate to processing of only one or two requests and the possibility of conflict conditions between them.)

The method 2300 begins in a state 2305, which may be reached as a result of any of the following conditions having occurred: the controller 101 is done with the processing or work involved in transitioning resource states in response to a request; the controller 101 receives a non-scheduled request for a resource state set transition; or the controller 101 determines that a scheduled start time ("$t_{start}$") for processing resource state transitions is imminent. In block 2310, which represents the beginning of the method 2300, the controller 101 determines whether any processing or work has been scheduled. As described above, such processing or work may be scheduled to start at periodic intervals, though the scheduled start time may be modified to alleviate conflict conditions.

If the controller 101 determines that it is time ("$t_{now}$") to perform such scheduled processing or work, then the controller 101 performs the processing or work as indicated by block 2315. If the controller 101 determines that it is not time to perform any scheduled processing or work, then, similar to block 1402 of FIG. 14, in block 2317, the controller may estimate workloads by creating hash values and comparing them to a system state cache 2705. Further details of routine or submethod Block 2317 will be described in further detail in connection with FIGS. 27 and 31 described below.

In block 2320, the controller 101 may process any non-scheduled request that is pending. There may be more than one non-scheduled request pending. Also, non-scheduled requests may have priority levels associated with them. If more than one non-scheduled request is pending, then the controller 101 works on the portion of the highest-priority pending non-scheduled request from that time until the next scheduled work start time ($t_{start}$). The next start time, $t_{start\_next}$, is:

$$t_{start\_next} = (t_{deadline\_next} - work\_next) - t_{now}.$$

Note that $t_{start\_next}$ in the above calculation is relative to $t_{now}$.

When the controller 101 completes processing or working on a portion (see FIG. 19) of the work associated with a non-scheduled request, controller 101 whether the processing or work includes further portions, as indicated by block 2325. If further portions exist, then the controller 101 works on the next portion in the same manner as described above with regard to block 2020. The term "highest-priority" above refers to a prioritization scheme that may be included in some embodiments. For example, a non-scheduled request that results from a user "turning off" the PCD 100, i.e., initiating a low-power state through the touchscreen 132 (FIG. 1), may be assigned a lower priority than other non-scheduled requests.

When the work is complete, in block 2330, similar to block 1322 of FIG. 13, the system state cache 2705 is updated by the controller 101 based on actual workload values. Further details of block 1322 will be described below in connection with FIG. 27B.

Figure 24:
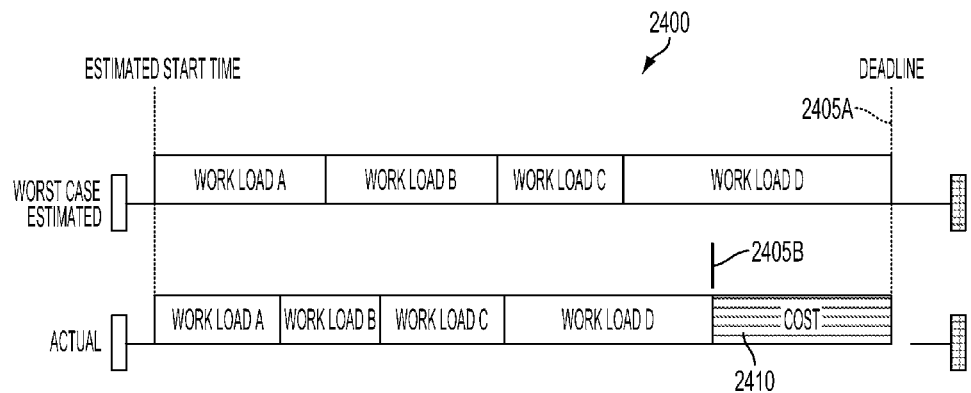
FIG. 24 is a graph that illustrates various workloads that may be handled by one or more resources in the portable computing device.

FIG. 24 is a graph that illustrates various workloads that may be handled by one or more resources 105 in the portable computing device 100. In the exemplary embodiment illustrated in FIG. 24, four workloads are depicted: workload A, workload B, workload C, and workload D.

Estimated deadline 2405A may correspond to a time at which workload D must finish in this deadline 2405 may impact that the start and finish times for the other the workloads. In some cases, the deadline 2405 could cause the other workloads to start earlier than they would have if workload D was not present.

If the system 103, and particularly, if the controller 101 does not have an accurate estimate of the total workload (workloads A-D in the aggregate) or the time to complete that various workloads, the controller 101 may generate sub optimal scheduling which may result in extra power being consumed by the system 103 unnecessarily. For example, assume that deadline 2405A is an estimated deadline generated by the system.

And suppose in the second graph, the actual time recorded to complete the workloads is illustrated in which the second deadline 2405B depicts the actual deadline that occurred within the system 103 after all workloads were completed. The system 103 would continue to power the resources associated with the fourth workload D until the estimated deadline 2405A, which would result wasted power for the system represented by block 2410.

In an optimal workload scenario, the later that resources 105 may be turned on by the system 103, and particularly the controller 101, then there will be less power consumed by the system 103 as understood by one of ordinary skill the art. In this optimal scenario, the cost of power would be lower compared to a system which has less accurate estimates of workloads were estimates on time when workloads are completed.

In concurrent work situations, accurate workload estimation causes the system 103 to be more accurate in determining whether or not if there is actual concurrency of the workload or overlap of the workload so that the system needs to schedule things earlier or push start times earlier into the timeline in order to make sure that all deadlines are met. The more accurate the workload estimate is, then the less pessimistic and more accurate the work overlap will be, and therefore, the controller 101 will generally not turn on resources 105 sooner than it needs to complete concurrent workloads.

In exemplary embodiments of the system 103, the controller 101 uses hash values to represent the system state as well as transitions. The controller 101 hashes current systems states as well as transitions. The transitions can include the sleep and active sets as described above with respect to FIGS. 3-4. The controller 101 also hashes incoming requests created by clients destined for one or more resources 105.

The controller 101 as illustrated in FIGS. 1-3 calculates the hash values described above. The controller 101 is taking elements of the state of the system which are usually represented by data structures that in an exemplary embodiment have about 800 bytes in length and reducing them into data structures having about four bytes or about thirty-two bits in length. In some exemplary embodiments, these data structures or hash values may have sixty-four bits in length. Other sizes for these data structures are within the scope of this disclosure as understood by one of ordinary skill in the art. These reduced data structures may be stored in a system state cache 2705 (See FIG. 27B), in which each smaller data structure has about four bytes assigned to its own unique identifier.

The state of the entire system 103 may easily be represented by a data structure having about 800 bytes in length. Meanwhile, requests which originate from clients may comprise a data structures having up to 800 bytes, but such requests may be much less than about 800 bytes.

The controller 101 may use a mix function and a combine function as part of its hash 2600 (See FIG. 26). The mix function of the hash 2600 emphasizes single bit differences as understood by one of ordinary skill in the art. For example, between two different systems states in which each could be represented with a data structure having about 800 bytes in size, the differences between the two states may be very slight and could come down to differences in the size of about two to three bytes.

Meanwhile, the mix function of the hash 2600 attempts to emphasize those single bit differences between systems states which are very close to one another in their characterization with a data structure that has about 800 bytes in size. The mix function creates unique hash values which usually improves accuracy of the system hash values.

With the combine function, this function uses a state topology which causes grouping among systems states to create more uniqueness in the hash values. One objective of the combine function is to take N-states and boils them down to a single 1-state representation.

Figure 25:
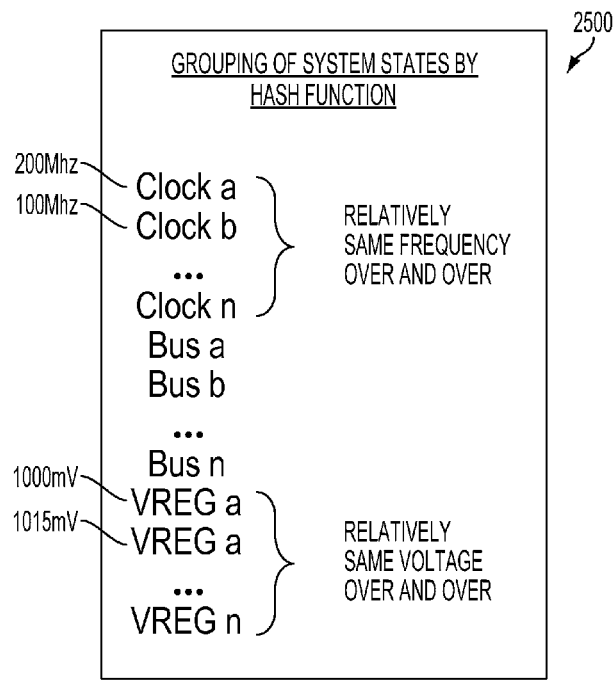
FIG. 25 is a chart which illustrates grouping within a state topology according to one exemplary embodiment.

FIG. 25 is a chart 2500 which illustrates grouping within a state topology according to one exemplary embodiment of the system 103. FIG. 25 demonstrates how differences among elements within a system state may be very slight. For example, a first clock "a" may have a frequency of 200 MHz while a second clock "b" has a frequency of 100 MHz. Similarly, a first voltage regulator "a" may have a setting of 1000 mV while a second voltage regulator "b" may have a setting of 1015 mV.

FIG. 26 is a chart which illustrates exemplary features of one embodiment of a hash function 2600 used by the controller 101. As noted previously, an exemplary embodiment of the hash function 2600 uses a mix and combine function. The combine function uses the unique index assigned to each resource 105 into the data structure representing the system state as a seed to a rotation function, which in the exemplary embodiment of a hash 2600 illustrated in FIG. 26, comprises multiplying the index by 13 mod by 32. Specifically, in the exemplary embodiment of the hash 2600 of FIG. 26, the numbers 13 and 32 were selected because they are relatively prime and may generate a unique set of rotations over approximately thirty-two resources.

It has been discovered that there are typically less than thirty-two resources in a portable computing device 100 that are similar and which are grouped in a topology. The rotation function within the combine function allows some randomization of which bits within the hash 2600 each resource affects. This allows more uniqueness to be achieved from the hash 2600, for example, by spreading clock readings all around the different bits within the hash 2600 rather than concentrating on all of the clock reading differences within the first four or first five bits of the hash 2600.

The combine function is using rotation by the each resource unique index to twist each of the system elements so that they are at different angles of rotation. In other words, by using each unique resource identifier (which may also be referred to a state topology index) for rotation, more uniqueness may be achieved across groupings of state elements. Rotation allows combining elements with similar states while minimizing any chances that this combining will cancel important information out.

By doing rotations in this manner, when the system elements are compressed, their differences, although slight as discussed above, do not overlap as much, as understood by one of ordinary skill in the art. Without rotation, when slight differences among states are combined, state information may be lost in the hash 2600.

Anytime the current state of the system changes the hash 2600 may be updated. In the exemplary embodiments illustrated in FIGS. 27-31 described below, the entire system 103 is not re-hashed when there is an update. Instead, only the portions of the system 103 which have changed are updated with the hash 2600. One of ordinary skill in the art recognizes that in other exemplary embodiments, the entire system 103 may be re-hashed if such an embodiment provided some advantages to the system 103.

In most conventional hashes, feedback is used. The feedback generally comprises the result of the hash prior to the hash update. Such feedback embodiments include those like MD5 and SHA are understood by one of ordinary skill in the art.

In other hash systems, feedback may not be used in which new information is combined on top of old information using XORing techniques as understood by one of ordinary skill in the art. However in such hash systems in which feedback is not used, a significant amount of collision between the new information and old information may occur.

In the exemplary hash 2600 described above, the system 103, and particularly, the controller 101, is taking into account how fields are provided with unique identifiers even though the content of the fields may resemble each other. The controller 101 may can mitigate these resemblances by rotating them using their unique index. While the states of the fields may have similar values, with the unique identifiers, the controller 101 recognizes that each field is representing the state of a separate and a different resource 105. In this way, an updatable hash 2600 is provided that operates similarly to hashes with feedback loops as described above.

The hash 2600 allows the system to quickly identify what system state currently exists. The controller 101 maintains a system state cache 2705 (See FIG. 27B) that records the actual time spent for various workloads that achieve results and systems states. The actual time spent and recorded in system state cache 2705 for various workloads corresponds with block 1322 of FIG. 13 and block 2330 of FIG. 23 mentioned above. Hashing in the exemplary embodiment of the system 103 allows the controller 101 to identify the current state that the system 103 is in.

Hashing allows the tracking of systems states when change in states occur. With the updatable hash 2600 described herein, the operation is not a very expensive one relative to the computing power required to update the hash when changes in system states occur.

For example, for a set of states such as a sleep set which is to occur in the future relative to a current set which is an active set, a hash 2600 can be created for the sleep set that is to occur in the future. The hash 2600 for the sleep set may be updated when changes occur to the sleep set prior to the sleep set actually being implemented. The hash 2600 can be set to be updated only when immediate changes are to occur for a given state that could include a change to a resource 105. This update to the hash 2600 for immediate requests may be performed to determine if the immediate requests may impact the state of any other future requests that are currently scheduled, such as the sleep set example described above.

By calculating hash values recursively to address multiple scheduled transitions within the system 103, the calculated system state resulting from each transition may be used to determine the initial system state for a future transition so that more accurate cache/hash-based workload estimations are used for each future transition. The more accurate the workload estimation, then more efficient scheduling may be made by turning resources on closer to when they are required by the system, which may reduce overall power consumption by the system. Further, the more rapid the estimation of system states are, then less overhead may be factored into scheduling.

FIG. 27A is a chart 2702 illustrating elements that may be used in a system state cache 2705 of FIG. 27B. Capital letter "S" may represent a system state hash 2600, while small letter "a" may represent the result of hash 2600 for a sub-state or action (request). The controller 101 uses the system states and sub-states to find matches in the system state cache 2705 so that the workload in units of time ($t_1$) may be found.

FIG. 27B illustrates a system state cache 2705 that tracks the current system state (represented by a capital letter "S" in the system state column 2710) as well as sub-states or actions (such as incoming requests or sleep sets, active sets represented by the small letter "a" in the sub-state column 2715) for calculating the resulting system state (represented by a capital letter "S" in the result system state column 2725). The sub-states or action values "a" in the system state cache 2705 are the results of the hash 2600 and its calculations made by the controller 101 described above.

The calculations for hash 2600 are derived by the controller 101 from sets of requests (such as active or sleep sets) that are intended to be completed in the future or sets of requests intended to be completed almost immediately. The system accounts for how requests that are intended to be completed almost immediately may impact future or scheduled requests that are to occur in the near future.

The controller 101 also tracks the worst-case workload estimate in units of time (represented by smaller letter "t" in the estimate column 2720) for that transition. The system state cache 2705 is continuously updated by the controller 101 by using the hash 2600 and its calculations. The sub-state or "a" values in column 2715 are calculated when incoming requests are received. The sub-states or "a" values in column 2715 may also be updated when a request is received by the controller 101.

The system state cache 2705 is basically a history that is recorded for the system for states of the system 103 that have occurred in the past. So for example, taking the first row of the system state cache 2725, in the past, a system state of $S_1$ that received a sub-state or action "$a_1$" resulted in a system state of $S_2$ and the time taken to reach this new system state of $S_2$ is time $t_1$.

The system uses the system state cache 2705 by comparing a current system state with each value in the system state column 2710 and by comparing the current sub-state or action with each value in the sub-state column 2715 in order to find a matching row. Once the system identifies a corresponding system state value 2710 and a sub-state value 2715, then the system may use the time estimate "t" from the time estimate column 2720. The system may also use the estimate of the resulted system state from column 2725.

For new system states, such as a system state of $S_5$ that may have never been recorded in the system state cache 2705 or if it is a system state that is much too old and was dropped or replaced by the system state cache 2705, then the controller may perform a full calculation to determine the time estimate for column 2720 and the resultant system state that is recorded in column 2725.

Each estimate of time "t" inserted in the system state cache 2705 is using the worst-case scenario calculated by the controller 101 before the actual action or sub-state of column 2715 is applied to the current system state listed in column 2710. Once the actual action or sub-state of column 2715 is applied to the current system state, then the actual time taken to complete the actual action or sub-state is recorded and is placed into the system state cache 2705 is the actual time if it is longer than the prior estimate determined by the system. This allows continuous improvement to the estimate of time "t" recorded in the system state cache 2705.

One of ordinary skill in the art will recognize that instead of updating the estimate of the time "t" recorded in the system state cache 2705 in column 2720 with the actual time taken for current action, the estimate of time that is kept could comprise a sliding window average, a weighted system average, a worst-case time observed by the system, and other like values. In the exemplary embodiment illustrated in FIG. 27, the worst-case time observed by the system is recorded in the time estimate column 2720.

This worst-case time value may ensure that the time estimate is never less than the actual workload that is performed by the system 103 based on the requests that were issued. It has been discovered that this worst-case time value does not allow the system to overestimate a workload by more than approximately 1% so that workloads are scheduled on time and finish on time.

Figure 28:
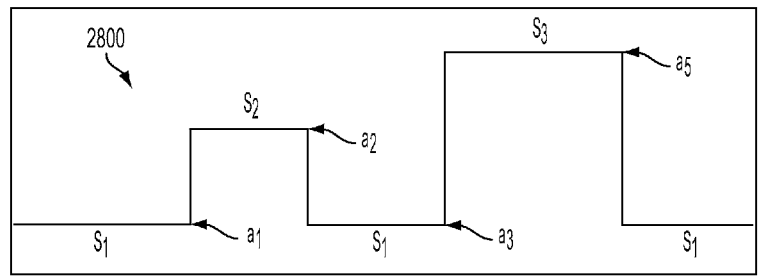
FIG. 28 is a graphical representation of the system state transitions that may be found within the system state cache of FIG. 27B.

FIG. 28 is a graphical representation of the system state transitions that may be found within the system state cache of FIG. 27B. For example, FIG. 28 illustrates how a system state $S_1$ may receive an action or sub-state $a_1$ that is computed by the hash function. Looking at FIG. 27B, there is a match between the system state $S_1$ and the sub-state $a_1$. The system state cache 2705 provides that applying such action $a_1$ to a current system state $S_1$ will result in a second system state $S_2$ with a workload estimate of $t_1$. Similarly, from the second system state $S_2$ which receives an action $a_2$ as illustrated in FIG. 28, a match also exists in the system state cache 2705 which shows the resultant system state from this action $a_1$ is the first system state $S_1$ with a workload estimate of $t_2$, and so on.

Figure 29:
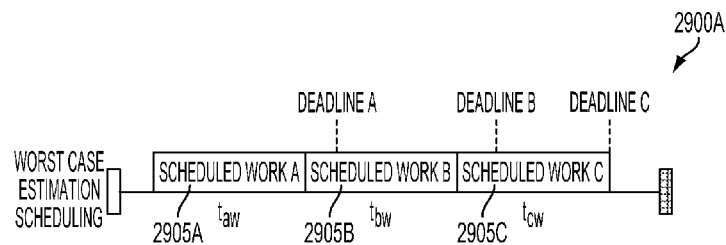
FIG. 29 illustrates a concurrent workload scenario that comprises 3 exemplary workloads.

FIG. 29 illustrates a concurrent workload scenario that comprises three exemplary workloads: a first scheduled work A 2905A, a second scheduled work B 2905B, and third scheduled work C 2905C. Each respective workload may have its own unique completion deadline A, B, and C represented by dashed lines.

The worst-case time $t_w$ may be calculated by the controller 101 for each workload. Since the worst-case time $t_{cw}$ for the third scheduled work C 2905C has a certain length or duration, this calculated worst-case time $t_{cw}$ by the controller 101 causes the scheduled work B 2905B to start and finish much earlier than its scheduled deadline B as illustrated in FIG. 29.

Similarly, since the worst-case time $t_{bw}$ for the second scheduled work B 2905B has a certain length or duration, this calculated worst-case time for $t_{bw}$ causes the scheduled work A 2905A to start and finish much earlier than its scheduled deadline A as illustrated in FIG. 29. This represents how the worst-case time $t_{cw}$ for the third scheduled work C 2905C may impact the start and finish times for the first scheduled work A 2905A and the start and finish times for the second scheduled work B 2905B.

Figure 30:
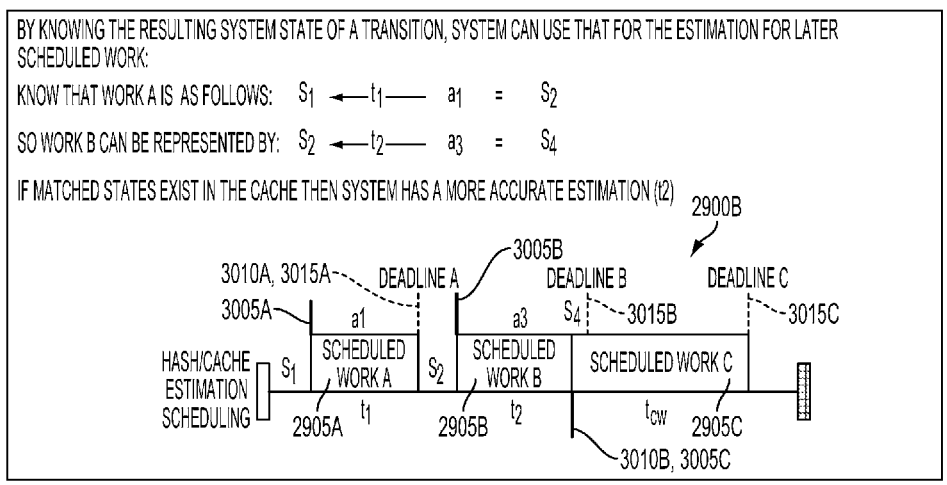
FIG. 30 illustrates the concurrent workload scenario of FIG. 29 after certain state transitions have been matched with the state system cache.

FIG. 30 illustrates the concurrent workload scenario of FIG. 29 after certain state transitions have been matched with the state system cache 2705. In the exemplary embodiment of FIG. 30, suppose the system state cache 2705 has values for the first work A 2905A and the second work B 2905B.

The values in the system state cache 2705 may comprise a current system state $S_1$ in which the first work A 2905A is represented by a sub-state $a_1$ that takes an estimated workload of time $t_1$ to reach the resultant second system state $S_2$. From the second system state $S_2$ and applying the second work B 2905B represented by the sub-state $a_3$, a resultant fourth system state $S_4$ is reached over an estimated workload of time $t_2$.

Meanwhile, the values for third workload C 2905C represented by sub-state $a_5$, the estimated workload represented by $t_{cw}$, and the resultant system state are unknown. In other words, values for sub-state $a_5$ and its corresponding workload $t_{cw}$ and resultant system state are not populated in the system state cache 2705 of FIG. 27B.

The system generally works backwards by comparing the finish time for the second workload B 2905B with the start time for the third workload C 2905C. However, the second workload B 2905B is impacted by the finish time of the first workload A 2905A as illustrated in FIG. 29.

Since the values for the first workload A 2905A and the second workload B 2905B are known and are populated in the system state cache 2705, then the controller 101 recognizes that first workload A 2905A will finish on time without any overlap with the second workload B 2905B at an estimated completion time 3010A (which is also the actual deadline 3015A that first workload A 2905 must finish in this example). Similarly, the controller 101 recognizes that the second workload B 2905B will finish on time at estimated completion time 3010B and actually before its scheduled deadline 3015B.

Therefore, the controller 101 may estimate the worst-case workload $t_{cw}$ for the third work C 2905C based on the estimated completion time 3010B for the second work B 2905B. The controller 101 recurses through or examines the states as described above to achieve better estimates of work completion times so that resources 105 are turned on or utilized closer to when they are exactly needed and only for times (durations) that they are actually needed to service one or more requests.

In the example of FIG. 30, the calculated estimated start time 3005B for the second workload 2905B based on the time $t_2$ is found not to overlap or interfere with the estimated completion time and deadline 3010A, 3015A of the first workload 2905A. In this exemplary embodiment, then the controller 101 may then focus on the calculations for the third workload C 2905C.

FIG. 30 corresponds with FIG. 12 described above in that the controller 101 now has information from the system state cache 2705 that allows the controller 101 to calculate the actual length or time (the length of the arrows) of the workloads depicted in FIG. 12. In other words, previously, the controller 101 did not have accurate estimates for the workloads and the estimated completion times that were used with FIG. 12 described above. Only worst-case scenario calculations have been used previously in connection with FIG. 12. With the system state cache 2705, more accurate calculations on estimated completion times by the controller 101 are possible as the system state cache 2705 of FIG. 27B is refined continuously as understood by one of ordinary skill in the art.

In terms of FIG. 12, this means that the actual length of work_0 and work_1 (the length of the arrows in time units, like seconds or milliseconds) may be provided in the system state cache 2705 of FIG. 27B. Further, the system state cache 2705 provides information of the state of the system 103 at start time tstart_0', as well as at tdeadline_0' and tstart_1 and at tdeadline_1.

FIG. 30 reflects how adding different workloads can impact the state of the system 103. The controller 101 must account for each workload that is added for completion. And with concurrency of workloads, each additional workload that may be added later in time may require recalculations of the start and finish times of all workloads that are to be completed in combination with a newly added workload as understood by one of ordinary skill in the art. With workload estimates that are more accurate and which are based on system states, this allows the controller 101 to accurately estimate start times and finish times for all scheduled tasks.

As noted previously, the controller 101 may compute the hash 2600 by reviewing and evaluating all requests and/or tasks that are to be scheduled whenever a new task and/or request is added to a schedule. Alternatively, and in the exemplary embodiments described above, the controller 101 only computes updates to the hash 2600 based on new tasks and/or requests which are received and by determining how each individual task and/or request may have an impact respect to other tasks and/or requests that are scheduled (specifically, how a new task and/or request may impact the start time and or finish time of other tasks and/or requests). In other words, in the exemplary embodiments described above, only the delta (change) for the system hash 2600 is evaluated (a partial hash is created) and not the entire task and/or requests that are in a schedule (not a full hash 2600 for the system 103). In the exemplary embodiments described above, the delta or differences for the transitions are significantly less than the total system state which may have a memory size of 800 bytes.

The controller 101 uses hash values to represent system states and to track transitions between states. The system is using a hash 2600 and the system state cache 2705 together to get fairly accurate estimations for temporally (time-wise) co-located events in order to speed up processing of tasks and/or requests among resources 105 of a portable computing device 100.

Figure 31:
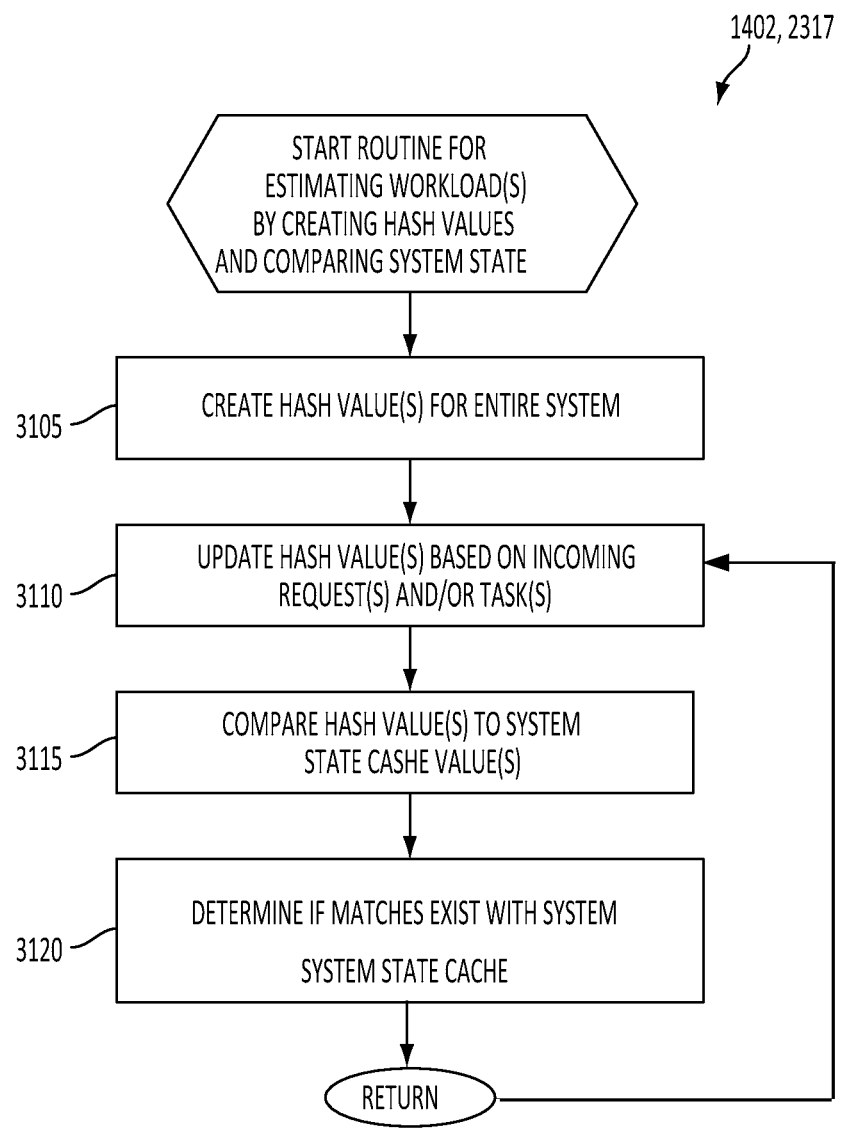
FIG. 31 is a flowchart for the submethods or routines of FIG. 14 and FIG. 23 for estimating workloads by creating hash values and comparing the hash values to a system state cache.

FIG. 31 is a flowchart for the submethods or routines 1402 of FIG. 14 and submethod 2317 of FIG. 23 for estimating workloads by creating hash values and comparing the hash values to a system state cache 2705. Block 3105 is the first block of the submethod 1402, 2317. In block 3105, the controller 101 creates hash values for the entire system 103 based on the hash 2600 as illustrated in FIG. 26. Usually, this block 3105 is only performed once by the controller 101.

Next, in block 3110, the controller 101 updates hash values using the hash 2600 based on incoming requests and/or tasks. In block 3115, the controller 101 compares hash values that have been calculated to the hash values stored in the system state cache 2705 as illustrated in FIG. 27B. In block 3120, the controller 101 determines if matches between values exist within the system state cache 2705 FIG. 27B.

In block 3125 a controller 101 estimates workloads based on any matches found within the cache 2705 and based on any calculations for non-matches which the controller 101 may need to perform. As noted previously, the submethod 1402, 2317 may perform partial updates by returning back to block 3110 before any work needs to be performed by one or more of the resources 105.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the disclosed system and method. In some instances, certain steps may be omitted or not performed without departing from the method as understood by one of ordinary skill in the art. Further, words such as "thereafter", "then", "next", etc. are not intended to limit the order of the steps. These words are simply used to guide the reader through the description of the exemplary method.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawing figures, which may illustrate various process flows.

In one or more exemplary aspects, the functions described may be implemented in hardware, software, firmware, or any combination thereof. If implemented in software, the functions may be stored as one or more instructions or code on a computer-readable medium. A computer-readable medium may include any available non-transitory media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing processor application states of a portable computing device having a first CPU and a second CPU and a plurality of shared processor resources for the first CPU and the second CPU, comprising:

maintaining in a memory of the portable computing device (1) a shared processor resource table comprising a first resource state set comprising states of the plurality of shared processor resources corresponding to a sleep application state and an active application state of the first CPU and a second resource state set comprising states of the plurality of shared processor resources corresponding to a sleep application state and an active application state of the second CPU, wherein the application states have corresponding values and (2) a plurality of trigger sets, wherein each trigger set is associated with the respective first CPU and second CPU and transitions a current application state of the associated CPU to a final application state based on certain conditions;

issuing a request to a controller to perform a system operation, wherein the controller determines based on the system operation, that one of the first CPU and the second CPU needs to transition from the current application state to one of the sleep application state and the active application state based on the first resource state set or the second resource state set and a respective trigger set of the plurality of trigger sets; and the controller transitioning the one of the first CPU and the second CPU from the sleep application state to the active application state or vice versa without a software handshake based on the shared processor resource table and the trigger sets by:

estimating an amount of processing time to complete transitioning of one or more of the shared processor resources associated with the issued request by creating hash values using a hash function in relation to the system operation to the first or second CPU to determine a respective trigger set of the plurality of trigger sets to invoke and based on a comparison to the current application state stored in the shared processor resource table;

scheduling a start time to begin transitioning the one or more shared processor resources from the current application state determined from the shared processor resource table to the corresponding value indicated in the determined trigger set based upon the estimated amount of processing time; and at the scheduled start time, beginning a process of switching states of the one or more shared processor resources to the final application state according to the values indicated in the shared processor resource table.

2. The method of claim 1, wherein the first and second resource state sets further comprise additional states of the plurality of shared processor resources corresponding to one or more additional application states of the first and second CPUs.

3. The method of claim 1, wherein the steps of scheduling a start time and beginning the process of switching states are performed by a controller.

4. The method of claim 1, wherein scheduling a start time comprises:

determining whether a conflict condition exists between a first process of switching states associated with a first request issued for the first CPU and a second process of switching states associated with a second request issued for the second CPU; and if it is determined that a conflict condition exists, alleviating the conflict condition by modifying a start time.

5. The method of claim 1, wherein the hash function uses at least one of a combine function and a mix function.

6. The method of claim 1, wherein the system states stored in memory comprises hash values calculated from the hash function and actual workload completion times.

7. The method of claim 1, further comprising:

creating hash values representing system states from the hash function; and comparing the hash values against system states stored in memory.

8. The method of claim 1, further comprising:

storing system states in memory as a cache.

9. The method of claim 1, further comprising:

updating system states stored in memory based on actual work performed by the one or more shared processor resources.

10. The method of claim 1, wherein the portable computing device comprises at least one of: a cellular telephone, a satellite telephone, a pager, a personal digital assistant (PDA), a smartphone, a navigation device, a smartbook or reader, a media player, and a laptop computer with a wireless connection.

11. A computer system for managing application states of a portable computing device having a first CPU and a second CPU and a plurality of shared processor resources for the first CPU and the second CPU, the system comprising:

a first CPU and a second CPU operable for:

maintaining in a memory of the portable computing device (1) a shared processor resource table comprising a first resource state set comprising states of the plurality of shared processor resources corresponding to a sleep application state and an active application state of the first CPU and a second resource state set comprising states of the plurality of shared processor resources corresponding to a sleep application state and a active application state of the second CPU, wherein the application states have corresponding values and (2) a plurality of trigger sets, wherein each trigger set is associated with the respective first CPU and second CPU and transitions a current application state of the associated CPU to a final application state based on certain conditions;

issuing a request to a controller to perform a system operation, wherein the controller determines based on the system operation that one of the first CPU and the second CPU needs to transition from the current application state to one of the sleep application state and the active application state based on the first resource state set or the second resource state set and a respective trigger set of the plurality of trigger sets; and transitioning the one of the first CPU and the second CPU from the sleep application state to the active application state or vice versa without a software handshake based on the shared processor resource table and the trigger sets by:

estimating an amount of processing time to complete transitioning of one or more of the shared processor resources associated with the issued request by creating hash values using a hash function in relation to the system operation to the first or second CPU to determine a respective trigger set of the plurality of trigger sets to invoke and based on a comparison to the current application state stored in the shared processor resource table;

scheduling a start time to begin transitioning the one or more shared processor resources from the current application state determined from the shared processor resource table to the corresponding value indicated in the determined trigger set based upon the estimated amount of processing time; and at the scheduled start time, beginning a process of switching states of the one or more shared processor resources to the final application state according to the values indicated in the shared processor resource table.

12. The system of claim 11, wherein the first and second resource state sets further comprise additional states of the plurality of shared processor resources corresponding to one or more additional application states of the first and second CPUs.

13. The system of claim 11, wherein the steps of scheduling a start time and beginning the process of switching states are performed by a controller.

14. The system of claim 11, wherein the scheduling a start time comprises:

the first CPU and the second CPU operable for determining whether a conflict condition exists between a first process of switching states associated with a first request issued for the first CPU and a second process of switching states associated with a second request issued for the second CPU; and if it is determined that a conflict condition exists, alleviating the conflict condition by modifying a start time.

15. The system of claim 11, wherein the hash function uses at least one of a combine function and a mix function.

16. The system of claim 11, wherein the system states stored in memory comprises hash values calculated from the hash function and actual workload completion times.

17. The system of claim 11, wherein the first CPU and the second CPU are further operable for:

creating hash values representing system states from the hash function; and comparing the hash values against system states stored in memory.

18. The system of claim 11, wherein the first CPU and the second CPU are further operable for:

storing system states in memory as a cache.

19. The system of claim 11, wherein the first CPU and the second CPU are further operable for:

updating system states stored in memory based on actual work performed by the one or more shared processor resources.

20. The system of claim 11, wherein the portable computing device comprises at least one of: a cellular telephone, a satellite telephone, a pager, a personal digital assistant (PDA), a smartphone, a navigation device, a smartbook or reader, a media player, and a laptop computer with a wireless connection.

21. A computer system for managing processor application states of a portable computing device having a first CPU and a second CPU and a plurality of shared processor resources for the first CPU and the second CPU, the system comprising:

means for maintaining in a memory of the portable computing device (1) a shared processor resource table comprising a first resource state set comprising states of the plurality of shared processor resources corresponding to a sleep application state and an active application state of the first CPU and a second resource state set comprising states of the plurality of shared processor resources corresponding to a sleep application state and an active application state of the second CPU, wherein the application states have corresponding values and (2) a plurality of trigger sets, wherein each trigger set is associated with the respective first CPU and second CPU and transitions a current application state of the associated CPU to a final application state based on certain conditions;

means for issuing a request to a controller to perform a system operation, wherein the controller determines based on the system operation that the one of the first CPU and the second CPU needs to transition from the current application state to one of the sleep application state and the active application state based on the first resource state set or the second resource state set and a respective trigger set of the plurality of trigger sets; and means for transitioning the one of the first CPU and the second CPU from the application state to the active application state or vice versa without a software handshake based on the shared processor resource table and the trigger sets, the means for transitioning comprising:

means for estimating an amount of processing time to complete transitioning of one or more of the shared processor resources associated with the issued request by creating hash values using a hash function in relation to the system operation to the first or second CPU to determine a respective trigger set of the plurality of trigger sets to invoke and based on a comparison to the current application state stored in the shared processor resource table;

means for scheduling a start time to begin transitioning the one or more shared processor resources from the current application state determined from the shared processor resource table to the corresponding value indicated in the determined trigger set based upon the estimated amount of processing time; and means for beginning, at the scheduled time, a process of switching states of the one or more shared processor resources to the final application state according to the values indicated in the shared processor resource table.

22. The computer system of claim 21, wherein the first and second resource state sets further comprise additional states of the plurality of shared processor resources corresponding to one or more additional application states.

23. The computer system of claim 21, wherein scheduling a start time and beginning the process of switching states are performed by a controller in communication with the first CPU and the second CPU.

24. The computer system of claim 21, wherein the means for scheduling a start time comprises:

means for determining whether a conflict condition exists between a first process of switching states associated with a first request issued for the first CPU and a second process of switching states associated with a second request issued for the second CPU; and means for alleviating the conflict condition by modifying a start time if it is determined that a conflict condition exists.

25. The computer system of claim 21, wherein the hash function uses at least one of a combine function and a mix function.

26. The computer system of claim 21, wherein the system states stored in memory comprises hash values calculated from the hash function and actual workload completion times.

27. The computer system of claim 21, further comprising:

means for creating hash values representing system states from the hash function; and means for comparing the hash values against system states stored in memory.

28. The computer system of claim 21, further comprising: means for storing system states in memory as a cache.

29. The computer system of claim 21, further comprising: means for updating system states stored in memory based on actual work performed by the one or more shared processor resources.

30. The computer system of claim 21, wherein the portable computing device comprises at least one of: a cellular telephone, a satellite telephone, a pager, a personal digital assistant (PDA), a smartphone, a navigation device, a smartbook or reader, a media player, and a laptop computer with a wireless connection.

31. A computer program product comprising a non-transitory computer usable medium, which is not a transitory computer usable medium or signal, having a computer readable program code embodied therein, said computer readable program code adapted to be executed to implement a method for managing processor application states of a portable computing device having a first CPU and a second CPU and a plurality of shared processor resources for the first CPU and the second CPU, said method comprising:
  maintaining in a memory of the portable computing device (1) a shared processor resource table comprising a first resource state set comprising states of the plurality of shared processor resources corresponding to a sleep application state and an active application state of the first CPU and a second resource state set comprising states of the plurality of shared processor resources corresponding to a sleep application state and an active application state of the second CPU, wherein the application states have corresponding values and (2) a plurality of trigger sets, wherein each trigger set is associated with the respective first CPU and second CPU and transitions a current application state of the associated CPU to a final application state based on certain conditions;
  issuing a request to a controller to perform a system operation, wherein the controller determines based on the system operation that one of the first CPU and the second CPU needs to transition from a current application state to one of the sleep application state and the active application state based on the first resource state set or the second resource state set and a respective trigger set of the plurality of trigger sets; and
  transitioning the one of the first CPU and the second CPU from the sleep application state to the active application state or vice versa without a software handshake based on the shared processor resource table and the trigger sets by:
    estimating an amount of processing time to complete transitioning of one or more shared processor resources associated with the issued request by creating hash values using a hash function in relation to the system operation to the first or second CPU to determine a respective trigger set of the plurality of trigger sets to invoke based on a comparison to the current application state stored in the shared processor resource table;
    scheduling a start time to begin transitioning the one or more shared processor resources from the current application state determined from the shared processor resource table to the corresponding value indicated in the determined trigger set based upon the estimated amount of processing time; and
    at the scheduled start time, beginning a process of switching states of the one or more shared processor resources to the final application state according to the values indicated in the shared processor resource table.

32. The computer program product of claim 31, wherein the first and second resource state sets further comprise additional states of the plurality of shared processor resources corresponding to one or more additional application states of the first and second CPUs.

33. The computer program product of claim 31, wherein the steps of scheduling a start time and beginning the process of switching states are performed by a controller.

34. The computer program product of claim 31, wherein scheduling a start time comprises:
  determining whether a conflict condition exists between a first process of switching states associated with a first request issued for the first CPU and a second process of switching states associated with a second request issued for the second CPU; and
  if it is determined that a conflict condition exists, alleviating the conflict condition by modifying a start time.

35. The computer program product of claim 31, wherein the hash function uses at least one of a combine function and a mix function.

36. The computer program product of claim 31, wherein the system states stored in memory comprises hash values calculated from the hash function and actual workload completion times.

37. The computer program product of claim 31, wherein the program code implementing the method further comprises:
  creating hash values representing system states from the hash function; and
  comparing the hash values against system states stored in memory.

38. The computer program product of claim 31, wherein the program code implementing the method further comprises:
  storing system states in memory as a cache.

39. The computer program product of claim 31, wherein the program code implementing the method further comprises:
  updating system states stored in memory based on actual work performed by the one or more shared processor resources.

40. The computer program product of claim 31, wherein the portable computing device comprises at least one of: a cellular telephone, a satellite telephone, a pager, a personal digital assistant (PDA), a smartphone, a navigation device, a smartbook or reader, a media player, and a laptop computer with a wireless connection.

* * * * *